(12) United States Patent
Choi et al.

(10) Patent No.: US 11,124,707 B2
(45) Date of Patent: Sep. 21, 2021

(54) PRODUCTION OF LIQUID HYDROCARBONS FROM POLYOLEFINS BY SUPERCRITICAL WATER

(71) Applicant: SAUDI ARABIAN OIL COMPANY, Dhahran (SA)

(72) Inventors: Ki-Hyouk Choi, Dhahran (SA); Ali S. Alnasir, Dhahran (SA); Mohammed Z. Albahar, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 16/716,999

(22) Filed: Dec. 17, 2019

(65) Prior Publication Data
US 2021/0179946 A1 Jun. 17, 2021

(51) Int. Cl.
| | |
|---|---|
| *C10G 1/10* | (2006.01) |
| *C10G 1/00* | (2006.01) |
| *B09B 3/00* | (2006.01) |

(52) U.S. Cl.
CPC .............. *C10G 1/10* (2013.01); *B09B 3/0083* (2013.01); *C10G 1/002* (2013.01);
(Continued)

(58) Field of Classification Search
CPC . C10G 1/10; C10G 1/06; C10G 31/06; C10G 31/08; C10G 53/02; C10G 9/00; C10G 55/04
See application file for complete search history.

(56) References Cited

U.S. PATENT DOCUMENTS 5,386,055 A   1/1995   Lee et al.
5,843,386 A   12/1998  Makino et al.
(Continued)

FOREIGN PATENT DOCUMENTS

CN   101935542 A   1/2011
DE   10259928 A1   7/2004
(Continued)

OTHER PUBLICATIONS

Elsevier 2010 (Fundamentals of Petroleum Refining, Chapter 2. Refinery feedstocks and prodcuts, 2010, Elsevier B.V.) (Year: 2010).*

(Continued)

*Primary Examiner* — Youngsul Jeong
(74) *Attorney, Agent, or Firm* — Bracewell LLP; Constance Gall Rhebergen

(57) ABSTRACT

Embodiments of the disclosure provide a method and system for recycling a plastic material to produce hydrocarbons. A plastic feed and a water feed are introduced to a first stage reactor. The first stage reactor is operated at a pressure equal to or greater than 22.06 MPa and a temperature equal to or greater than 373.9 deg. C. to produce an effluent stream. Residual solid components can be removed from the effluent stream. The effluent stream is introduced to a second stage reactor. The second stage reactor is operated at a pressure less than that of the first stage reactor but equal to or greater than 22.06 MPa and a temperature greater than that of the first stage reactor to produce a product stream. The plastic feed can include polyolefins. Optionally, a sulfur additive feed can be introduced either to the first stage reactor or the second stage reactor. Optionally, a residual oil feed can be introduced either to the first stage reactor or the second stage reactor.

15 Claims, 5 Drawing Sheets

(52) U.S. Cl.
CPC .......... *C10G 2300/1003* (2013.01); *C10G 2300/107* (2013.01); *C10G 2300/1077* (2013.01); *C10G 2300/202* (2013.01); *C10G 2300/4006* (2013.01); *C10G 2300/4012* (2013.01); *C10G 2300/80* (2013.01)

(56) References Cited

U.S. PATENT DOCUMENTS

| | | | |
|---|---|---|---|
| 6,090,291 | A | 7/2000 | Akai et al. |
| 6,107,532 | A | 8/2000 | Saito et al. |
| 6,504,068 | B1 | 1/2003 | Matsubara et al. |
| 8,535,518 | B2 | 9/2013 | Choi et al. |
| 8,980,143 | B2 | 3/2015 | Loop et al. |
| 9,145,523 | B2 | 9/2015 | Choi et al. |
| 9,771,524 | B2 | 9/2017 | Xu et al. |
| 2008/0099374 | A1 | 5/2008 | He et al. |
| 2015/0321975 | A1* | 11/2015 | Choi .............. C10G 9/00 585/400 |
| 2018/0187093 | A1 | 7/2018 | Choi et al. |
| 2018/0245001 | A1* | 8/2018 | Humphreys .......... C10G 1/10 |

FOREIGN PATENT DOCUMENTS

| | | |
|---|---|---|
| JP | H06279762 A | 10/1994 |
| JP | H1088146 A | 4/1998 |
| WO | 2012167794 A2 | 12/2012 |

OTHER PUBLICATIONS

Bai, et al., Co-pyrolysis of residual oil and polyethylene in sub- and supercritical water, Fuel Processing technology, vol. 160, 267-274 (2013).

Chen, et al., The Use of Supercritical Water for the Liquefaction of Polypropylene into Oil, ACS Sustainable Chemistry & Engineering, Publication Date (Web): Jan. 10, 2019, 38 pgs.

Kishita, et al., Hydrothermal Cracking of Polyethylene, Polypropylene, and/or Polystyrene Mixtures under Supercritical Water Condition, Resources Processing, 2005, vol. 52, Issue 1, pp. 14-24.

Liu, et al., Upgrading of Residual Oil in Sub- and Supercritical Water: An Experimental Study, Fuel Processing Technology, vol. 106, Feb. 2013, pp. 281-288.

Moriya, et al., Characteristics of polyethylene cracking in supercritical water compared to thermal cracking, Polymer Degradation and Stability, vol. 65, pp. 373-386 (1999).

Moriya, et al., Investigation of the Basic Hydrothermal Cracking Conditions of Polyethylene in Supercritical Water, Shigen-to-Sozai, vol. 115, p. 245-251, 1999.

Park, et al., Depolymerization of Styrene-Butadiene Copolymer in Near-Critical and Supercritical Water, (Industrial & Engineering Chemistry Research, 2001, 40(3), 756-767.

Stelmachowski, et al., Thermal Conversion of Waste Polyolefins to the Mixture of Hydrocarbons in the Reactor with Molten Metal Bed, Energy Conversion and Management, vol. 51, Issue 10, Oct. 2010, pp. 2016-2024.

Su, et al., Investigation on Degradation of Polyethylene to Oil in a Continuous Supercritical Water Reactor, Elsevier, Fuel Processing Technology 85 (2004) 1249-1258.

Tan, et al., Co-Pyrolysis of Heavy Oil and Low Density Polyethylene in the Presence of Supercritical Water: The Suppression of Coke Formation, Fuel Processing Technology, vol. 118, Feb. 2014, pp. 49-54.

Ucar, et al., Co-Pyrolysis of Water Polyolefins with Waste Motor Oil, Journal of Analytical and Applied Pyrolysis, vol. 119, May 2016, pp. 233-241).

Watanabe, et al., Polyethylene conversion in supercritical water, J. Supercritical Fluid, vol. 13, pp. 247-252 (1998).

Wu, et al., Fractionation of Multi-Component Hydrocarbon Droplets in Water at Supercritical or Near-Critical Conditions, J. Supercritical Fluids, vol. 72 pp. 150-160 (2012).

Yan, et al., A Review of Upgrading Heavy Oils with Supercritical Fluids, RSC Advances, 2015, 5, 75129-75140.

Yuan, et al., Quantitative and Qualitative Analysis of Products Formed During Co-Liquefaction of Biomass and Synthetic Polymer Mixtures in Sub- and Supercritical Water, Fuel Processing Technology, vol. 90, Issue 3, Mar. 2009, pp. 428-434.

Zhang, et al., Investigation on Degradation of Polyethylene to Oil in a Continuous Supercritical Water Reactor, Journal of Fuel Chemistry and Technology, vol. 35, Issue 4, Aug. 2007.

PCT ISRWO dated Mar. 29, 2021, in the prosecution of International application dated Mar. 29, 2021, 14 pages.

\* cited by examiner

PRODUCTION OF LIQUID HYDROCARBONS FROM POLYOLEFINS BY SUPERCRITICAL WATER

BACKGROUND

Field of the Disclosure

Embodiments of the disclosure generally relate to processing polymers. More specifically, embodiments of the disclosure relate to a method and system for processing polyolefins using supercritical water to produce hydrocarbons.

Description of the Related Art

Recycling plastic waste has been extensively studied throughout the years and widely implemented in the commercial scale. Typically, plastic waste is recycled in a physical manner, where the plastic waste is heated to a molten state to be reformed. Plastic waste can be recycled in a chemical manner, where the plastic waste is chemically processed to produce a non-polymer product. The non-polymer product can exist in solid, liquid, and gaseous forms. One example process involves the combustion of plastic waste to produce carbon monoxide, hydrogen, carbon dioxide, and other gases that can be used as syngas for hydrocarbon processing.

Polyolefins, such as polyethylene and polypropylene, are one of the most widely produced plastics in the world. Accordingly, chemically recycling polyolefins has been a topic that was extensively studied throughout the years due to the amount of polyolefin waste produced. Polyolefins are generally considered being chemically stable. Due to its chemical stability, thermal decomposition of polyolefins tend to result in forming coke or char. Thermal decomposition of polyolefins requires a relatively long residence time in the reactor to produce meaningful quantities of gas and liquid hydrocarbons. While the exterior surfaces are being decomposed under thermal decomposition conditions, the unexposed interior of the polyolefin material may convert into coke or char. Another example of chemically recycling polyolefins is catalytic decomposition. Catalytic decomposition of polyolefins has a relatively low conversion rate due to constraints related to the catalyst. The relatively high viscosity of molten polyolefins makes it difficult to wet the entire surface area of the catalyst, where a substantial portion of the surface area is represented by the interior pores of the catalyst. In addition, it is difficult to implement a continuous process in catalytic decomposition of polyolefins because of plugging issues caused by unconverted polyolefins and waxy products.

SUMMARY

Embodiments of the disclosure generally relate to processing polymers. More specifically, embodiments of the disclosure relate to a method and system for processing polyolefins using supercritical water to produce hydrocarbons.

Embodiments of the disclosure provide a method for recycling a plastic material to produce hydrocarbons. The method includes the step of introducing a plastic feed and a water feed to a first stage reactor. The plastic feed includes the plastic material. The first stage reactor is operated at a pressure equal to or greater than 22.06 MPa and a temperature equal to or greater than 373.9 deg. C. to produce an effluent stream. The effluent stream includes a mixture of the plastic material and water. The method includes the step of introducing the effluent stream to a second stage reactor. The second stage reactor is operated at a pressure less than that of the first stage reactor but equal to or greater than 22.06 MPa and a temperature greater than that of the first stage reactor to produce a product stream. The product stream includes the hydrocarbons.

In some embodiments, the plastic material includes polyolefins including polyethylene, polypropylene, polybutylene, and combinations of the same. In some embodiments, the first stage reactor is operated at a pressure ranging between 27 MPa and 35 MPa and a temperature ranging between 380 deg. C. and 420 deg. C. In some embodiments, the second stage reactor is operated at a pressure ranging between 24 MPa and 27 MPa and a temperature ranging between 420 deg. C. and 470 deg. C. In some embodiments, the effluent stream includes a decomposed form of the plastic material. In some embodiments, the method further includes the step of removing residual solid components from the effluent stream.

In some embodiments, the method further includes the step of introducing a sulfur additive feed to the first stage reactor by combining the sulfur additive feed and the water feed. The sulfur additive feed includes sulfur-containing hydrocarbons including thiols, sulfides, disulfides, and combinations of the same. In some embodiments, the sulfur additive feed has a total sulfur content of greater than 5 wt. %.

In some embodiments, the method further includes the step of introducing a residual oil feed to the first stage reactor by combining the residual oil feed and the plastic feed. The residual oil feed includes a residual oil including atmospheric residue, vacuum residue, and combinations of the same. In some embodiments, the residual oil has a total sulfur content of greater than 0.1 wt. %. The residual oil includes sulfur-containing hydrocarbons including thiols, sulfides, disulfides, and combinations of the same.

In some embodiments, the method further includes the step of introducing a residual oil feed to the second stage reactor by combining the residual oil feed and the effluent stream. The residual oil feed includes a residual oil including atmospheric residue, vacuum residue, and combinations of the same. In some embodiments, the residual oil has a total sulfur content of greater than 0.1 wt. %. The residual oil includes sulfur-containing hydrocarbons including thiols, sulfides, disulfides, and combinations of the same.

In some embodiments, the method further includes the step of cooling the product stream to a temperature ranging between 80 deg. C. and about 120 deg. C. In some embodiments, the method further includes the step of depressurizing the product stream to a pressure ranging between 1 MPa and 5 MPa. In some embodiments, the method further includes the step of introducing the product stream to a separator to produce a gas product stream, a liquid product stream, and a water product stream. The gas product stream includes gaseous hydrocarbons. The liquid product stream includes liquid hydrocarbons.

Embodiments of the disclosure also provide a plastic recycling system to produce hydrocarbons from a plastic material. The plastic recycling system includes a first pump, a first heat exchanger, a second pump, a second heat exchanger, a first stage reactor, a first separator, a second stage reactor, a third heat exchanger, a pressure reducer, and a second separator. The first pump is configured to pressurize a plastic feed to a pressure ranging between 27 MPa and 35 MPa. The plastic feed includes the plastic material. The first heat exchanger is configured to heat the plastic feed to a temperature ranging between 80 deg. C. and 160 deg. C. The second pump is configured to pressurize a water feed to a pressure ranging between 27 MPa and 35 MPa. The second heat exchanger configured to heat the water feed to a temperature ranging between 380 deg. C. and 430 deg. C. The first stage reactor is fluidly connected downstream of the first pump and the first heat exchanger and fluidly connected downstream of the second pump and the second heat exchanger. The first stage reactor is operated at a pressure ranging between 27 MPa and 35 MPa and a temperature ranging between 380 deg. C. and 420 deg. C. to produce an effluent stream. The effluent stream includes a mixture of the plastic material and water. A portion of the plastic material is decomposed. The first separator is fluidly connected downstream of the first stage reactor. The first separator is configured to substantially remove residual solid components from the effluent stream. The second stage reactor is fluidly connected downstream of the first separator. The second stage reactor is operated at a pressure ranging between 24 MPa and 27 MPa and a temperature ranging between 420 deg. C. and 470 deg. C. to produce a product stream. The product stream includes the hydrocarbons. The third heat exchanger is fluidly connected downstream of the second stage reactor. The third heat exchanger is configured to cool the product stream to a temperature ranging between 80 deg. C. and about 120 deg. C. The pressure reducer fluidly connected downstream of the second stage reactor. The pressure reducer is configured to depressurize the product stream to a pressure ranging between 1 MPa and 5 MPa. The second separator is fluidly connected downstream of the third heat exchanger and the pressure reducer. The second separator is configured to separate the product stream into a gas product stream, a liquid product stream, and a water product stream. The gas product stream includes gaseous hydrocarbons. The liquid product stream includes liquid hydrocarbons.

In some embodiments, the plastic recycling system further includes a first mixer. The first mixer is fluidly connected downstream of the first pump and the first heat exchanger, fluidly connected downstream of the second pump and the second heat exchanger, and fluidly connected upstream of the first stage reactor. The first mixer is configured to combine the plastic feed and the water feed.

In some embodiments, the plastic recycling system further includes a third pump, a fourth heat exchanger, and a second mixer. The third pump is configured to pressurize a sulfur additive feed to a pressure ranging between 27 MPa and 35 MPa. The sulfur additive feed includes sulfur-containing hydrocarbons including thiols, sulfides, disulfides, and combinations of the same. The fourth heat exchanger is configured to heat the sulfur additive feed to a temperature ranging between 100 deg. C. and 200 deg. C. The second mixer is fluidly connected downstream of the second pump and the second heat exchanger, fluidly connected downstream of the third pump and the fourth heat exchanger, and fluidly connected upstream of the first stage reactor. The second mixer is configured to combine the water feed and the sulfur additive feed.

In some embodiments, the plastic recycling system further includes a third pump, a fourth heat exchanger, and a second mixer. The third pump is configured to pressurize a sulfur additive feed to a pressure ranging between 27 MPa and 35 MPa. The sulfur additive feed includes sulfur-containing hydrocarbons including thiols, sulfides, disulfides, and combinations of the same. The fourth heat exchanger is configured to heat the sulfur additive feed to a temperature ranging between 100 deg. C. and 200 deg. C. The second mixer is fluidly connected downstream of the first separator and fluidly connected upstream of the second stage reactor. The second mixer is configured to combine the effluent stream and the sulfur additive feed.

In some embodiments, the plastic recycling system further includes a fourth pump, a fifth heat exchanger, and a third mixer. The fourth pump is configured to pressurize a residual oil feed to a pressure ranging between 27 MPa and 35 MPa. The residual oil feed includes a residual oil including atmospheric residue, vacuum residue, and combinations of the same. The fifth heat exchanger is configured to heat the residual oil feed to a temperature ranging between 100 deg. C. and 300 deg. C. The third mixer is fluidly connected downstream of the first pump and the first heat exchanger, fluidly connected downstream of the fourth pump and the fifth heat exchanger, and fluidly connected upstream of the first stage reactor. The third mixer is configured to combine the plastic feed and the residual oil feed.

In some embodiments, the plastic recycling system further includes a fourth pump, a fifth heat exchanger, and a third mixer. The fourth pump is configured to pressurize a residual oil feed to a pressure ranging between 27 MPa and 35 MPa. The residual oil feed includes a residual oil including atmospheric residue, vacuum residue, and combinations of the same. The fifth heat exchanger is configured to heat the residual oil feed to a temperature ranging between 100 deg. C. and 300 deg. C. The third mixer is fluidly connected downstream of the first separator and fluidly connected upstream of the second stage reactor. The third mixer is configured to combine the effluent stream and the residual oil feed.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1:
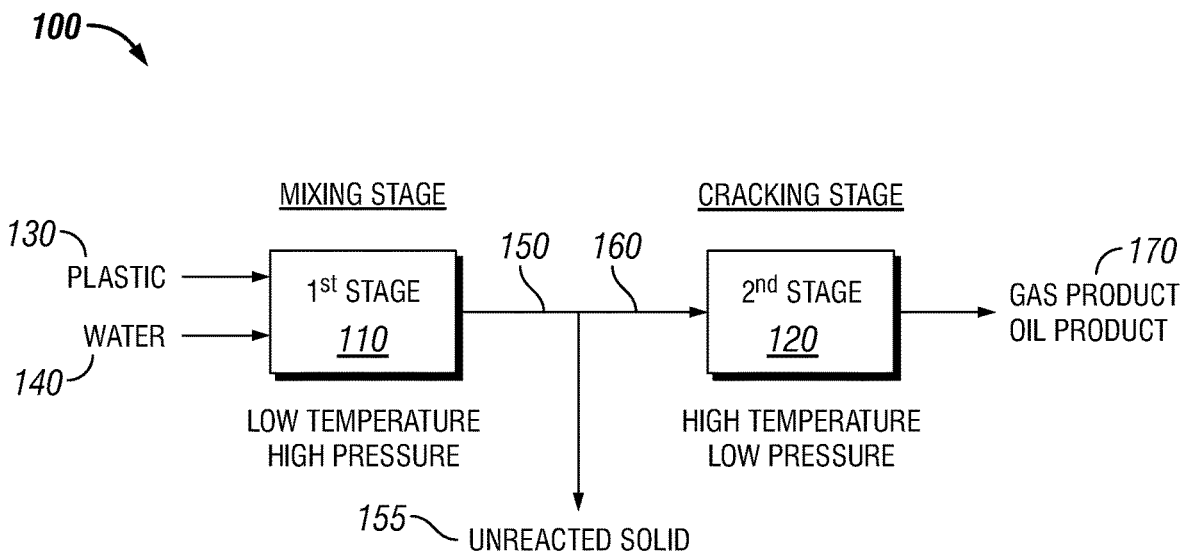
FIG. 1 is a schematic diagram of a process for recycling polymers according to an embodiment of the disclosure.

In the accompanying Figure, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words such are for descriptive convenience and are not limiting unless otherwise indicated.

As used throughout the disclosure, the terms "plastic" or "plastic material" refer to synthetic organic polymers that are malleable and can be molded into solid objects.

As used throughout the disclosure, the term "melt mass flow rate" refers to a rate of extrusion of a molten plastic through a die of specified length and diameter under prescribed conditions of temperature, load and piston position in the cylinder of an extrusion plastometer, the rate being determined as the mass extruded over a specified time. The mass flow rate is expressed in units of grams per 10 minutes (g/10 min).

As used throughout the disclosure, the term "atmospheric residue" refers to the fraction of oil-containing streams having an initial boiling point (IBP) of 340 deg. C., such that all of the hydrocarbons have boiling points greater than 340 deg. C. and includes the vacuum residue fraction. Atmospheric residue can refer to the composition of an entire stream, such as when the feedstock is from an atmospheric distillation unit, or can refer to a fraction of a stream, such as when a whole range crude is used.

As used throughout the disclosure, the term "vacuum residue" refers to the fraction of oil-containing streams having an IBP of 540 deg. C. Vacuum residue can refer to the composition of an entire stream, such as when the feedstock is from a vacuum distillation unit or can refer to a fraction of stream, such as when a whole range crude is used.

As used throughout the disclosure, the term "asphaltene" refers to the fraction of an oil-containing stream which is not soluble in a n-alkane, particularly, n-heptane.

As used throughout the disclosure, the terms "heavy hydrocarbon," or "heavy oil" refer to the fraction in the petroleum feed having a true boiling point (TBP) 10% that is equal to or greater than about 340 deg. C., or alternately equal to or greater than about 540 deg. C. In at least one embodiment, the heavy fraction has a TBP 10% that is equal to or greater than about 540 deg. C. Examples of a heavy fraction can include the atmospheric residue fraction or vacuum residue fraction. The heavy fraction can include components from the petroleum feed that were not converted in a supercritical water reactor. The heavy fraction can also include hydrocarbons that were dimerized or oligomerized in the supercritical water reactor due to either lack of hydrogenation or resistance to thermal cracking.

As used throughout the disclosure, the term "coke" refers to a toluene insoluble material that is present in petroleum or is formed in a reactor.

As used throughout the disclosure, the terms "mercaptan" or "thiol" refer to a compound with a carbon-sulfur bond in the form R—SH, where R can have a carbon number from 1 to 12.

As used throughout the disclosure, the term "sulfide" refers to aliphatic, organic, sulfur-containing compounds taking the form R—S—R', where each of R and R' can have a carbon number from 1 to 10.

As used throughout the disclosure, the term "disulfide" refers to aliphatic, organic, sulfur-containing compounds taking the form R—S—S—R', where each of R and R' can have a carbon number from 1 to 10.

As used throughout the disclosure, the term "cracking" refers to the breaking of hydrocarbons into smaller ones containing few carbon atoms due to the breaking of carbon-carbon bonds.

As used throughout the disclosure, the term "upgrade" means one or all of increasing API gravity, decreasing the amount of impurities, such as sulfur, nitrogen, and metals, decreasing the amount of asphaltene, and increasing the amount of distillate in a process outlet stream relative to the process feed stream. One of skill in the art understands that upgrade can have a relative meaning such that a stream can be upgraded in comparison to another stream, but can still contain undesirable components such as impurities. Such upgrading results in increase of API gravity, shifting distillation curve to lower temperature, decrease of asphaltene content, decrease of viscosity, and increase of light fractions such as naphtha and diesel.

As used throughout the disclosure, the term "conversion reaction" refers to one or more reactions that can upgrade a hydrocarbon stream including cracking, isomerization, alkylation, dimerization, aromatization, cyclization, desulfurization, denitrogenation, deasphalting, and demetallization.

It is known in the art that supercritical water has unique properties making it suitable for use as a petroleum reaction medium where the reaction objectives can include conversion reactions, desulfurization reactions, denitrogenation reactions, and demetallization reactions. Supercritical water is water at a temperature at or greater than the critical temperature of water and at a pressure at or greater than the critical pressure of water. The critical temperature of water is 373.946 deg. C. The critical pressure of water is 22.06 megapascals (MPa). Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water gas shift reaction.

Without being bound any theory, it is understood that the basic reaction mechanism of supercritical water mediated petroleum processes is similar to a free radical reaction mechanism. Radical reactions include initiation, propagation, and termination steps. With hydrocarbons, initiation is the most difficult step. Initiation requires the breaking of chemical bonds. The bond energy of carbon-carbon bonds (C—C) is about 350 kilojoules per mole (kJ/mol), while the bond energy of carbon-hydrogen bonds (C—H) is about 420 kJ/mol, both of which are considered high chemical bond energies. Due to the high chemical bond energies, carbon-carbon bonds and carbon-hydrogen bonds do not break easily at the temperatures in a supercritical water process, 380 deg. C. to 450 deg. C., without catalyst or radical initiators.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke or char formation are suppressed. The cage effect suppresses coke or char formation by limiting inter-radical reactions. Supercritical water, having low dielectric constant, dissolves hydrocarbons and surrounds radicals to prevent the inter-radical reaction, which is the termination reaction resulting in condensation (dimerization or polymerization). Because of the barrier set by the supercritical water cage, hydrocarbon radical transfer is more difficult in supercritical water as compared to conventional thermal cracking processes, such as delayed coker, where radicals travel freely without such barriers.

Embodiments of the disclosure provide a system and process for continuously recycling polyolefins in a chemical manner to produce useful liquid phase and gas phase hydrocarbons. The polyolefins are subjected to a first stage reactor operated at a temperature ranging between about 380 deg. C. and about 430 deg. C. and a pressure ranging between about 27 MPa and about 35 MPa. Under these operating conditions, the polyolefins swell and mix with supercritical water, and are decomposed to a certain degree to form a preconditioned mixture. After separating solid materials such as unreacted polyolefins, coke, and char, the fluid phase preconditioned mixture is subjected to a second stage reactor operated at a temperature ranging between about 420 deg. C. and about 470 deg. C. and a pressure ranging between about 24 MPa and about 27 MPa (that is, a temperature greater than that of the first reactor and a pressure less than that of the first reactor). Under these operating conditions, the polyolefins are substantially decomposed and cracked to produce useful liquid and gaseous hydrocarbons. In some embodiments, a sulfur additive can be introduced to the process to enhance the liquid hydrocarbon yield. In some embodiments, a residual oil can be introduced to the process to enhance the liquid hydrocarbon yield. Advantageously, using multiple reactors in series under different operating conditions allows continuous operation as opposed to a batch process.

The supercritical water under the operating conditions of the first stage reactor has a $pK_w$ range between about 12.1 and about 19.7, indicative of an ionic fluid. The supercritical water under the operating conditions of the second stage reactor has a $pK_w$ range between about 19.7 and about 22.3, indicative of a lesser ionic fluid than water in the first stage reactor. In the first stage reactor, the ionic nature of the supercritical water can induce hydrolysis reactions when in contact with the solid phase polyolefin surface. The hydrolysis reactions can assist in breaking carbon-carbon bonds. The hydrolysis reactions can also assist in wetting and swelling the solid phase polyolefin surface due to the production of alcoholic compounds. The first stage reactor operated at a lesser temperature and greater pressure than those of the second stage reactor results in the water having a greater density than that in the second stage reactor. The greater density of water in the first stage reactor enhances water penetration into the polyolefins in the first stage reactor. In the event the operating conditions of the first stage reactor and the second stage reactor are reversed (that is, the second stage reactor is operated at a lesser temperature and greater pressure than those of the first stage reactor), the polyolefins may undergo undesired reactions to produce gas and solid products resulting in a reduced yield of liquid phase hydrocarbons.

In some embodiments, plastic materials are introduced to the process. Non-limiting example plastic materials include polyolefins (such as polyethylene, polypropylene, and polybutylene), polyester, poly(methyl methacrylate) (PMMA), polycarbonate, and polystyrene. Non-limiting example plastic materials also include copolymers of polyolefins and copolymers of ethylene vinyl acetate (EVA). In at least one embodiment, the plastic material is a polyolefin. In at least one embodiment, the plastic material is polyethylene. In at least one embodiment, the plastic material is polypropylene. The plastic material can be obtained from waste plastic or can be a virgin product. The density of the plastic material can range between about 0.1 grams per cubic centimeter ($g/cm^3$) and about 2 $g/cm^3$, alternately between about 0.5 $g/cm^3$ and about 1.5 $g/cm^3$, or alternately between about 0.8 $g/cm^3$ and about 1.2 $g/cm^3$. In at least one embodiment, the plastic material has a density of about 0.95 $g/cm^3$. The plastic material can exist in a solid or molten form. In some embodiments, a solid plastic material can exist in a granular or chip form to increase surface area. In some embodiments, a slurry pump can be used to introduce the plastic materials to the process, where the plastic material is in a substantially homogeneously dispersed slurry phase in the presence of water.

In some embodiments, water is introduced to the process. Water can be a demineralized water. Water can have a conductivity less than about 1.0 microSiemens per centimeter ($\mu S/cm$), alternately less than about 0.5 $\mu S/cm$, or alternately less than about 0.1 $\mu S/cm$. In at least one embodiment, water has a conductivity less than about 0.1 $\mu S/cm$. Water can have a sodium content less than about 10 micrograms per liter ($\mu g/L$), alternately less than about 5 $\mu g/L$, or alternately less than about 1 $\mu g/L$. In at least one embodiment, water has a sodium content less than about 1 $\mu g/L$. Water can have a chloride content less than about 5 $\mu g/L$, alternately less than about 3 $\mu g/L$, or alternately less than about 1 $\mu g/L$. In at least one embodiment, water has a chloride content less than about 1 $\mu g/L$. Water can have a silica content less than about 5 $\mu g/L$, alternately less than about 4 $\mu g/L$, or alternately less than about 3 $\mu g/L$. In at least one embodiment, water has a silica content less than about 3 $\mu g/L$.

In some embodiments, a sulfur additive can be introduced to the process. The sulfur additive can include sulfur-containing hydrocarbons. The sulfur-containing hydrocarbons can include aliphatic sulfur compounds such as thiols, sulfides, and disulfides. Non-limiting example thiols include aliphatic thiols such as butanethiol, pentanethiol, and hexanethiol. Non-limiting example sulfides include aliphatic sulfides such as dibutyl sulfide, dipentyl sulfide, and dihexyl sulfide. Non-limiting example disulfides include aliphatic disulfides such as dibutyl disulfide, dipentyl disulfide, and dihexyl disulfide. The total sulfur content of the sulfur additive can be greater than about 1 wt. %, alternately greater than about 3 wt. %, and alternately greater than about 5 wt. %. In at least one embodiment, the total sulfur content of the sulfur additive is about 7.8 wt. %.

In some embodiments, a residual oil is introduced to the process. The residual oil can be obtained from any heavy oil source derived from petroleum, coal liquid, or biomaterials. Non-limiting examples of residual oil can include whole range crude oil, distilled crude oil, residue oil, atmospheric residue, vacuum residue, vacuum gas oil, deasphalted oil, topped crude oil, refinery streams, product streams from steam cracking processes, liquefied coals, liquid products recovered from oil or tar sands, bitumen, oil shale, asphalthene, liquid hydrocarbons recovered from gas-to-liquid (GTL) processes, and biomass derived hydrocarbons. In at least one embodiment, the residual oil can include an atmospheric residue, a vacuum residue, a vacuum gas oil, and a deasphalted oil. "Whole range crude oil" refers to passivated crude oil which has been processed by a gas-oil separation plant after being recovered from a production well. "Topped crude oil" can also be known as "reduced crude oil" and refers to a crude oil having no light fraction, and would include an atmospheric residue stream or a vacuum residue stream. "Refinery streams" can include "cracked oil," such as light cycle oil, heavy cycle oil, and streams from a fluid catalytic cracking unit (FCC), such as slurry oil or decant oil, a heavy stream from hydrocracker with a boiling point greater than 340 deg. C., a deasphalted oil (DAO) stream from a solvent extraction process, and a mixture of atmospheric residue and hydrocracker bottom fractions.

The residual oil can have a TBP 10% greater than about 540 deg. C., alternately greater than about 400 deg. C., or alternately greater than about 340 deg. C. In at least one embodiment, the residual oil has a TBP 10% of about 360 deg. C. The residual oil can include sulfur-containing hydrocarbons. The sulfur-containing hydrocarbons can include aliphatic sulfur compounds such as thiols, sulfides, and disulfides. The residual oil can have a total sulfur content greater than about 0.01 wt. %, alternately greater than about 0.05 wt. %, or alternately greater than about 0.1 wt. %. In at least one embodiment, the residual oil has a total sulfur content of about 3.95 wt. %. Greater than about 1%, alternately greater than about 5%, or alternately greater than about 10% of the sulfur-containing hydrocarbons are aliphatic sulfur compounds.

FIG. 1 shows a schematic diagram of a process 100 for recycling polymers. The process 100 can include a first stage reactor 110 and a second stage reactor 120.

A plastic feed 130 is introduced to the first stage reactor 110. A water feed 140 is introduced to the first stage reactor 110. In some embodiments, the plastic feed 130 and the water feed 140 can be premixed before being introduced to the first stage reactor 110 using any type of mixing device capable of mixing the plastic feed 130 and the water feed 140, such as a tee junction, a static mixer, an inline mixer, and impeller-embedded mixer. In other embodiments, the plastic feed 130 and the water feed 140 are separately introduced to the first stage reactor 110. The plastic feed 130 and the water feed 140 are introduced to the first stage reactor 110 having a water-to-plastic mass flow ratio ranging between about 1 and about 20 at standard ambient temperature and pressure (SATP), alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products.

The first stage reactor 110 is maintained at a temperature and pressure such that the water is in its supercritical state. The first stage reactor 110 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 110 is maintained at a temperature ranging between about 380 deg. C. and about 420 deg. C. Means for maintaining such temperature of the first stage reactor 110 can include a strip heater, immersion heater, tubular furnace, heat exchanger, or like devices known in the art. The first stage reactor 110 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 110 is maintained at a pressure ranging between about 27 MPa and about 35 MPa. The first stage reactor 110 can be a tubular type reactor, a vessel type reactor, a continuous stirred-tank reactor (CSTR), and combinations of the same. In at least one embodiment, the first stage reactor 110 is a CSTR. The water and the plastic material can have a residence time in the first stage reactor 110 ranging between about 0.1 minute (min) and about 60 min, alternately between about 1 min and about 45 min, or alternately between about 2 min and about 30 min. In at least one embodiment the residence time of the water and the plastic material in the first stage reactor 110 ranges between about 2 min and 30 min. The residence time is calculated by assuming that the densities of the reactants in the first stage reactor 110 are similar to that of water at operating conditions of the first stage reactor 110. In at least one embodiment, the first stage reactor 110 is in the absence of an external supply of catalyst. In at least one embodiment, the first stage reactor 110 is in the absence of an external supply of hydrogen. The product of the first stage reactor 110 is collected via an effluent stream 150.

Unreacted solid components from the first stage reactor 110 are separated from the effluent stream 150. By using any type of separation device capable of separating solid components from the effluent stream 150, any residual solid components (such as unreacted plastic material, coke, and char) in the effluent stream 150 are collected via the waste stream 155 to produce a feed stream 160. The feed stream 160 includes fluid components from the first stage reactor 110 only.

The feed stream 160 is introduced to the second stage reactor 120. The second stage reactor 120 is maintained at a temperature and pressure such that the water is in its supercritical state. The temperature of the second stage reactor 120 is greater than that of the first stage reactor 110. The second stage reactor 120 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 120 is maintained at a temperature ranging between about 420 deg. C. and about 470 deg. C. Means for maintaining such temperature of the second stage reactor 120 can include a strip heater, immersion heater, tubular furnace, heat exchanger, or like devices known in the art. The pressure of the second stage reactor 120 is less than that of the first stage reactor 110. The second stage reactor 120 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 120 is maintained at a pressure ranging between about 24 MPa and about 27 MPa. The second stage reactor 120 can be a tubular type reactor, a vessel type reactor, a CSTR, and combinations of the same. In at least one embodiment, the second stage reactor 120 is a tubular type reactor. In at least one embodiment, the second stage reactor 120 is a vessel type reactor. The components of the feed stream 160 can have a residence time in the second stage reactor 120 ranging between about 0.1 min and about 40 min, alternately between about 0.5 min and about 30 min, or alternately between about 1 min and about 20 min. In at least one embodiment the residence time of the components of the feed stream 160 in the second stage reactor 120 ranges between about 1 min and about 20 min. The residence time is calculated by assuming that the densities of the reactants in the second stage reactor 120 are similar to that of water at operating conditions of the second stage reactor 120. In at least one embodiment, the second stage reactor 120 is in the absence of an external supply of catalyst. In at least one embodiment, the second stage reactor 120 is in the absence of an external supply of hydrogen. The product of the second stage reactor 120 is collected via a product stream 170.

Figure 2:
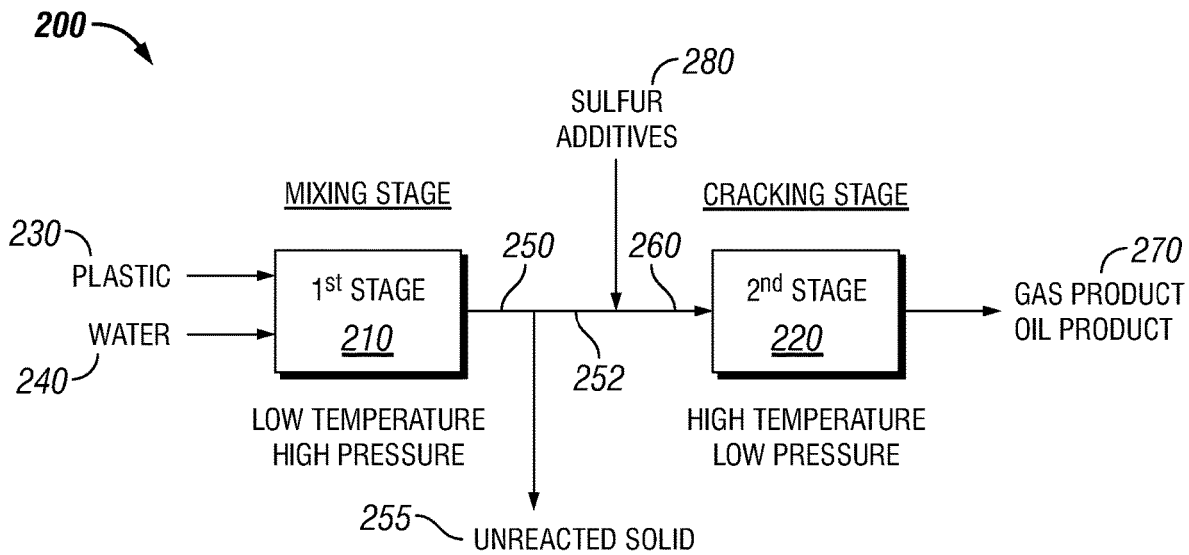
FIG. 2 is a schematic diagram of a process for recycling polymers according to an embodiment of the disclosure.

FIG. 2 shows a schematic diagram of a process 200 for recycling polymers. The process 200 can include a first stage reactor 210 and a second stage reactor 220.

A plastic feed 230 is introduced to the first stage reactor 210. A water feed 240 is introduced to the first stage reactor 210. In some embodiments, the plastic feed 230 and the water feed 240 can be premixed before being introduced to the first stage reactor 210 using any type of mixing device capable of mixing the plastic feed 230 and the water feed 240, such as a tee junction, a static mixer, an inline mixer, and impeller-embedded mixer. In other embodiments, the plastic feed 230 and the water feed 240 are separately introduced to the first stage reactor 210. The plastic feed 230 and the water feed 240 are introduced to the first stage reactor 210 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products.

The first stage reactor 210 is maintained at a temperature and pressure such that the water is in its supercritical state. The first stage reactor 210 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 210 is maintained at a temperature ranging between about 380 deg. C. and about 420 deg. C. Means for maintaining such temperature of the first stage reactor 210 can include a strip heater, immersion heater, tubular furnace, heat exchanger, or like devices known in the art. The first stage reactor 210 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 210 is maintained at a pressure ranging between about 27 MPa and about 35 MPa. The first stage reactor 210 can be a tubular type reactor, a vessel type reactor, a CSTR, and combinations of the same. In at least one embodiment, the first stage reactor 210 is a CSTR. The water and the plastic material can have a residence time in the first stage reactor 210 ranging between about 0.1 min and about 60 min, alternately between about 1 min and about 45 min, or alternately between about 2 min and about 30 min. In at least one embodiment the residence time of the water and the plastic material in the first stage reactor 210 ranges between about 2 min and 30 min. The residence time is calculated by assuming that the densities of the reactants in the first stage reactor 210 are similar to that of water at operating conditions of the first stage reactor 210. In at least one embodiment, the first stage reactor 210 is in the absence of an external supply of catalyst. In at least one embodiment, the first stage reactor 210 is in the absence of an external supply of hydrogen. The product of the first stage reactor 210 is collected via an effluent stream 250.

Unreacted solid components from the first stage reactor 210 are separated from the effluent stream 250. By using any type of separation device capable of separating solid components from the effluent stream 250, any residual solid components (such as unreacted plastic material, coke, and char) in the effluent stream 250 are collected via the waste stream 255 to produce a fluid stream 252.

A sulfur additive feed 280 is introduced to the process 200. The sulfur additive feed 280 is combined with the fluid stream 252 to produce a feed stream 260 using any type of mixing device such as a tee junction, a static mixer, an inline mixer, and impeller-embedded mixer. The feed stream 260 includes fluid components from the first stage reactor 210 and the sulfur additive.

The feed stream 260 is introduced to the second stage reactor 220. The second stage reactor 220 is maintained at a temperature and pressure such that the water is in its supercritical state. The temperature of the second stage reactor 220 is greater than that of the first stage reactor 210. The second stage reactor 220 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 220 is maintained at a temperature ranging between about 420 deg. C. and about 470 deg. C. Means for maintaining such temperature of the second stage reactor 220 can include a strip heater, immersion heater, tubular furnace, heat exchanger, or like devices known in the art. The pressure of the second stage reactor 220 is less than that of the first stage reactor 210. The second stage reactor 220 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 220 is maintained at a pressure ranging between about 24 MPa and about 27 MPa. The second stage reactor 220 can be a tubular type reactor, a vessel type reactor, a CSTR, and combinations of the same. In at least one embodiment, the second stage reactor 220 is a tubular type reactor. In at least one embodiment, the second stage reactor 220 is a vessel type reactor. The components of the feed stream 260 can have a residence time in the second stage reactor 220 ranging between about 0.1 min and about 40 min, alternately between about 0.5 min and about 30 min, or alternately between about 1 min and about 20 min. In at least one embodiment the residence time of the components of the feed stream 260 in the second stage reactor 220 ranges between about 1 min and about 20 min. The residence time is calculated by assuming that the densities of the reactants in the second stage reactor 220 are similar to that of water at operating conditions of the second stage reactor 220. In at least one embodiment, the second stage reactor 220 is in the absence of an external supply of catalyst. In at least one embodiment, the second stage reactor 220 is in the absence of an external supply of hydrogen. The product of the second stage reactor 220 is collected via a product stream 270. The feed stream 260 is introduced to the second stage reactor 220 having a sulfur additive-to-plastic mass flow ratio ranging between about $10^{-5}$ and about 100 at SATP, alternately between about $10^{-4}$ and about 10 at SATP, or alternately between about $10^{-3}$ and about 1 at SATP. In at least one embodiment, the sulfur additive-to-plastic mass flow ratio is about 0.007.

Figure 3:
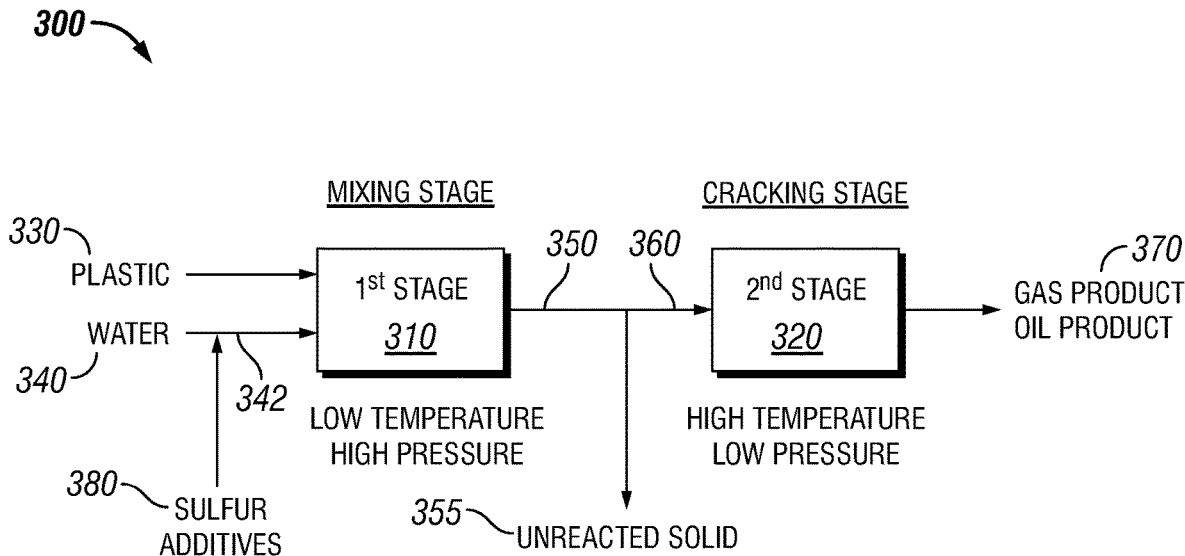
FIG. 3 is a schematic diagram of a process for recycling polymers according to an embodiment of the disclosure.

FIG. 3 shows a schematic diagram of a process 300 for recycling polymers. The process 300 can include a first stage reactor 310 and a second stage reactor 320.

A plastic feed 330 is introduced to the first stage reactor 310. A water feed 340 is introduced to the first stage reactor 310. A sulfur additive feed 380 is introduced to the first stage reactor 310. The sulfur additive feed 380 is combined with the water feed 340 to produce a mixed feed 342 using any type of mixing device capable of mixing the sulfur additive feed 380 and the water feed 340, such as a tee junction, a static mixer, an inline mixer, and impeller-embedded mixer. In some embodiments, the plastic feed 330 and the mixed feed 342 can be premixed before being introduced to the first stage reactor 310 using any type of mixing device capable of mixing the plastic feed 330 and the mixed feed 342, such as a tee junction, a static mixer, an inline mixer, and impeller-embedded mixer. In other embodiments, the plastic feed 330 and the mixed feed 342 are separately introduced to the first stage reactor 310. The plastic feed 330 and the mixed feed 342 are introduced to the first stage reactor 310 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products. The plastic feed 330 and the mixed feed 342 are introduced to the first stage reactor 310 having a sulfur additive-to-plastic mass flow ratio ranging between about $10^{-5}$ and about 100 at SATP, alternately between about $10^{-4}$ and about 10 at SATP, or alternately between about $10^{-3}$ and about 1 at SATP. In at least one embodiment, the sulfur additive-to-plastic mass flow ratio is about 0.007.

The first stage reactor 310 is maintained at a temperature and pressure such that the water is in its supercritical state. The first stage reactor 310 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 310 is maintained at a temperature ranging between about 380 deg. C. and about 420 deg. C. Means for maintaining such temperature of the first stage reactor 310 can include a strip heater, immersion heater, tubular furnace, heat exchanger, or like devices known in the art. The first stage reactor 310 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 310 is maintained at a pressure ranging between about 27 MPa and about 35 MPa. The first stage reactor 310 can be a tubular type reactor, a vessel type reactor, a CSTR, and combinations of the same. In at least one embodiment, the first stage reactor 310 is a CSTR. The water, the plastic material, and the sulfur additive can have a residence time in the first stage reactor 310 ranging between about 0.1 min and about 60 min, alternately between about 1 min and about 45 min, or alternately between about 2 min and about 30 min. In at least one embodiment the residence time of the water, the plastic material, and the sulfur additive in the first stage reactor 310 ranges between about 2 min and 30 min. The residence time is calculated by assuming that the densities of the reactants in the first stage reactor 310 are similar to that of water at operating conditions of the first stage reactor 310. In at least one embodiment, the first stage reactor 310 is in the absence of an external supply of catalyst. In at least one embodiment, the first stage reactor 310 is in the absence of an external supply of hydrogen. The product of the first stage reactor 310 is collected via an effluent stream 350.

Unreacted solid components from the first stage reactor 310 are separated from the effluent stream 350. By using any type of separation device capable of separating solid components from the effluent stream 350, any residual solid components (such as unreacted plastic material, coke, and char) in the effluent stream 350 are collected via the waste stream 355 to produce a feed stream 360. The feed stream 360 includes fluid components from the first stage reactor 310 only.

The feed stream 360 is introduced to the second stage reactor 320. The second stage reactor 320 is maintained at a temperature and pressure such that the water is in its supercritical state. The temperature of the second stage reactor 320 is greater than that of the first stage reactor 310. The second stage reactor 320 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 320 is maintained at a temperature ranging between about 420 deg. C. and about 470 deg. C. Means for maintaining such temperature of the second stage reactor 320 can include a strip heater, immersion heater, tubular furnace, heat exchanger, or like devices known in the art. The pressure of the second stage reactor 320 is less than that of the first stage reactor 310. The second stage reactor 320 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 320 is maintained at a pressure ranging between about 24 MPa and about 27 MPa. The second stage reactor 320 can be a tubular type reactor, a vessel type reactor, a CSTR, and combinations of the same. In at least one embodiment, the second stage reactor 320 is a tubular type reactor. In at least one embodiment, the second stage reactor 320 is a vessel type reactor. The components of the feed stream 360 can have a residence time in the second stage reactor 320 ranging between about 0.1 min and about 40 min, alternately between about 0.5 min and about 30 min, or alternately between about 1 min and about 20 min. In at least one embodiment the residence time of the components of the feed stream 360 in the second stage reactor 320 ranges between about 1 min and about 20 min. The residence time is calculated by assuming that the densities of the reactants in the second stage reactor 320 are similar to that of water at operating conditions of the second stage reactor 320. In at least one embodiment, the second stage reactor 320 is in the absence of an external supply of catalyst. In at least one embodiment, the second stage reactor 320 is in the absence of an external supply of hydrogen. The product of the second stage reactor 320 is collected via a product stream 370.

Figure 4:
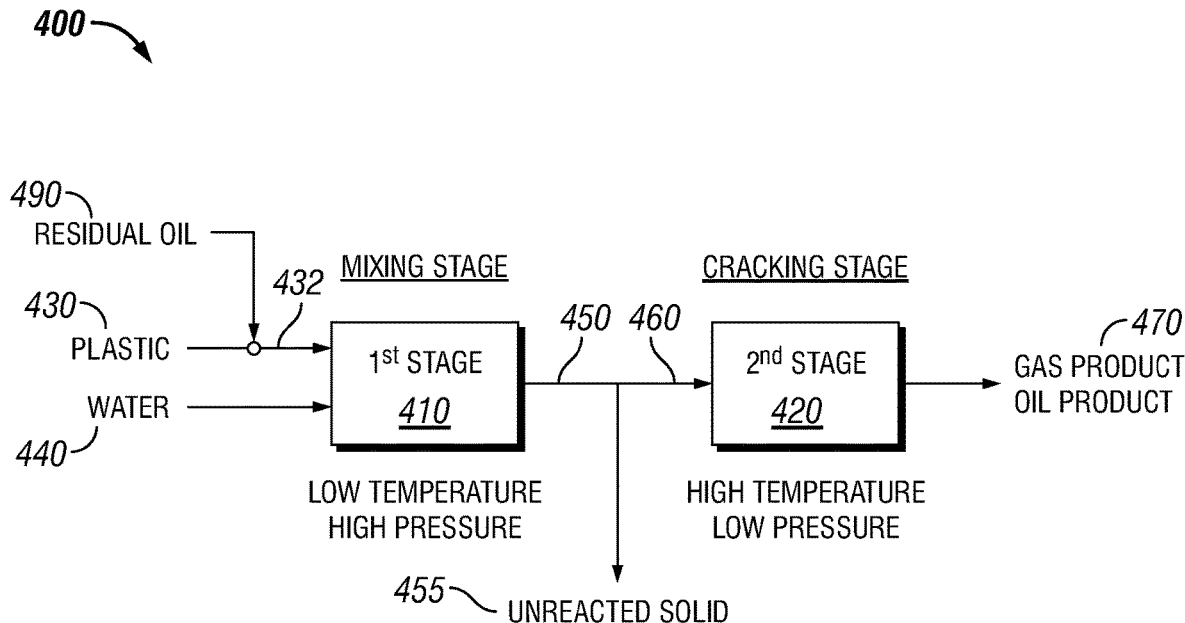
FIG. 4 is a schematic diagram of a process for recycling polymers according to an embodiment of the disclosure.

FIG. 4 shows a schematic diagram of a process 400 for recycling polymers. The process 400 can include a first stage reactor 410 and a second stage reactor 420.

A plastic feed 430 is introduced to the first stage reactor 410. A water feed 440 is introduced to the first stage reactor 410. A residual oil feed 490 is introduced to the first stage reactor 410. The residual oil feed 490 is combined with the plastic feed 430 to produce a mixed feed 432 using any type of mixing device capable of mixing the residual oil feed 490 and the plastic feed 430, such as a tee junction, a static mixer, an inline mixer, and impeller-embedded mixer. In some embodiments, the water feed 440 and the mixed feed 432 can be premixed before being introduced to the first stage reactor 410 using any type of mixing device capable of mixing the water feed 440 and the mixed feed 432, such as a tee junction, a static mixer, an inline mixer, and impeller-embedded mixer. In other embodiments, the water feed 440 and the mixed feed 432 are separately introduced to the first stage reactor 410. The water feed 440 and the mixed feed 432 are introduced to the first stage reactor 410 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products. The water feed 440 and the mixed feed 432 are introduced to the first stage reactor 410 having a residual oil-to-plastic mass flow ratio ranging between about 0.01 and about 100 at SATP, alternately between about 0.05 and about 10 at SATP, or alternately between about 0.1 and about 1 at SATP. In at least one embodiment, the residual oil-to-plastic mass flow ratio is about 0.5.

The first stage reactor 410 is maintained at a temperature and pressure such that the water is in its supercritical state. The first stage reactor 410 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 410 is maintained at a temperature ranging between about 380 deg. C. and about 420 deg. C. Means for maintaining such temperature of the first stage reactor 410 can include a strip heater, immersion heater, tubular furnace, heat exchanger, or like devices known in the art. The first stage reactor 410 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 410 is maintained at a pressure ranging between about 27 MPa and about 35 MPa. The first stage reactor 410 can be a tubular type reactor, a vessel type reactor, a CSTR, and combinations of the same. In at least one embodiment, the first stage reactor 410 is a CSTR. The water, the plastic material, and the residual oil can have a residence time in the first stage reactor 410 ranging between about 0.1 min and about 60 min, alternately between about 1 min and about 45 min, or alternately between about 2 min and about 30 min. In at least one embodiment the residence time of the water, the plastic material, and the residual oil in the first stage reactor 410 ranges between about 2 min and 30 min. The residence time is calculated by assuming that the densities of the reactants in the first stage reactor 410 are similar to that of water at operating conditions of the first stage reactor 410. In at least one embodiment, the first stage reactor 410 is in the absence of an external supply of catalyst. In at least one embodiment, the first stage reactor 410 is in the absence of an external supply of hydrogen. The product of the first stage reactor 410 is collected via an effluent stream 450.

Unreacted solid components from the first stage reactor 410 are separated from the effluent stream 450. By using any type of separation device capable of separating solid components from the effluent stream 450, any residual solid components (such as unreacted plastic material, coke, and char) in the effluent stream 450 are collected via the waste stream 455 to produce a feed stream 460. The feed stream 460 includes fluid components from the first stage reactor 410 only.

The feed stream 460 is introduced to the second stage reactor 420. The second stage reactor 420 is maintained at a temperature and pressure such that the water is in its supercritical state. The temperature of the second stage reactor 420 is greater than that of the first stage reactor 410. The second stage reactor 420 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 420 is maintained at a temperature ranging between about 420 deg. C. and about 470 deg. C. Means for maintaining such temperature of the second stage reactor 420 can include a strip heater, immersion heater, tubular furnace, heat exchanger, or like devices known in the art. The pressure of the second stage reactor 420 is less than that of the first stage reactor 410. The second stage reactor 420 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 420 is maintained at a pressure ranging between about 24 MPa and about 27 MPa. The second stage reactor 420 can be a tubular type reactor, a vessel type reactor, a CSTR, and combinations of the same. In at least one embodiment, the second stage reactor 420 is a tubular type reactor. In at least one embodiment, the second stage reactor 420 is a vessel type reactor. The components of the feed stream 460 can have a residence time in the second stage reactor 420 ranging between about 0.1 min and about 40 min, alternately between about 0.5 min and about 30 min, or alternately between about 1 min and about 20 min. In at least one embodiment the residence time of the components of the feed stream 460 in the second stage reactor 420 ranges between about 1 min and about 20 min. The residence time is calculated by assuming that the densities of the reactants in the second stage reactor 420 are similar to that of water at operating conditions of the second stage reactor 420. In at least one embodiment, the second stage reactor 420 is in the absence of an external supply of catalyst. In at least one embodiment, the second stage reactor 420 is in the absence of an external supply of hydrogen. The product of the second stage reactor 420 is collected via a product stream 470.

Figure 5:
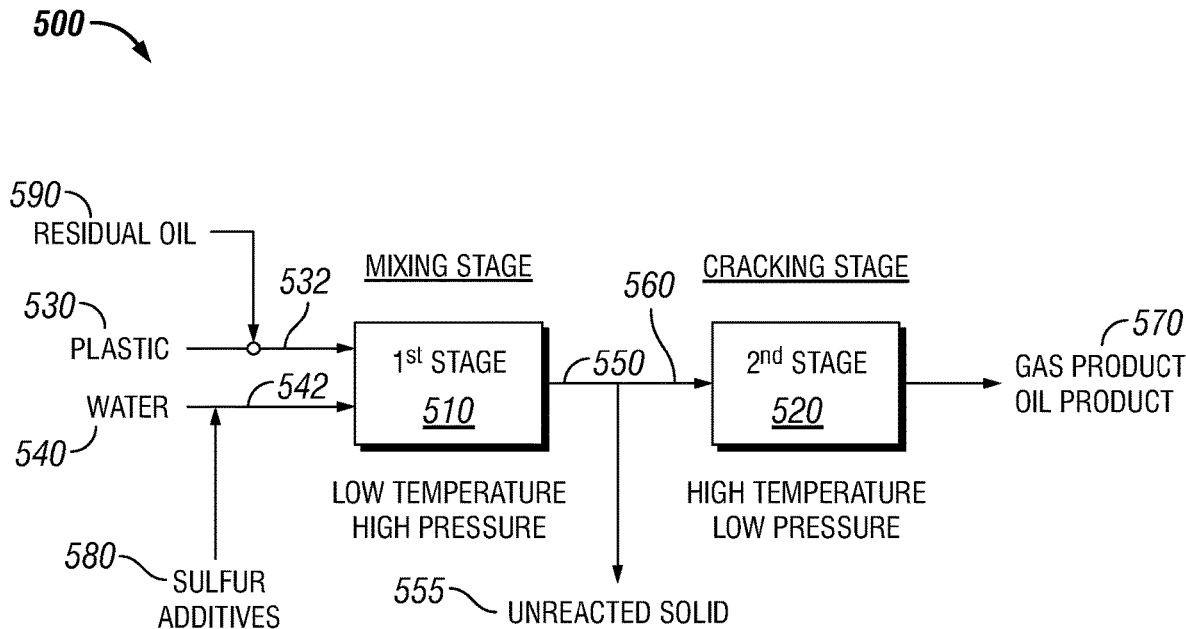
FIG. 5 is a schematic diagram of a process for recycling polymers according to an embodiment of the disclosure.

FIG. 5 shows a schematic diagram of a process 500 for recycling polymers. The process 500 can include a first stage reactor 510 and a second stage reactor 520.

A plastic feed 530 is introduced to the first stage reactor 510. A water feed 540 is introduced to the first stage reactor 510. A sulfur additive feed 580 is introduced to the first stage reactor 510. The sulfur additive feed 580 is combined with the water feed 540 to produce a first mixed feed 542 using any type of mixing device capable of mixing the sulfur additive feed 580 and the water feed 540, such as a tee junction, a static mixer, an inline mixer, and impeller-embedded mixer. A residual oil feed 590 is introduced to the first stage reactor 510. The residual oil feed 590 is combined with the plastic feed 530 to produce a second mixed feed 532 using any type of mixing device capable of mixing the residual oil feed 590 and the plastic feed 530, such as a tee junction, a static mixer, an inline mixer, and impeller-embedded mixer. In some embodiments, the first mixed feed 542 and the second mixed feed 532 can be premixed before being introduced to the first stage reactor 510 using any type of mixing device capable of mixing the first mixed feed 542 and the second mixed feed 532, such as a tee junction, a static mixer, an inline mixer, and impeller-embedded mixer. In other embodiments, the first mixed feed 542 and the second mixed feed 532 are separately introduced to the first stage reactor 510. The first mixed feed 542 and the second mixed feed 532 are introduced to the first stage reactor 510 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products. The first mixed feed 542 and the second mixed feed 532 are introduced to the first stage reactor 510 having a sulfur additive-to-plastic mass flow ratio ranging between about $10^{-5}$ and about 100 at SATP, alternately between about $10^{-4}$ and about 10 at SATP, or alternately between about $10^{-3}$ and about 1 at SATP. In at least one embodiment, the sulfur additive-to-plastic mass flow ratio is about 0.007. The first mixed feed 542 and the second mixed feed 532 are introduced to the first stage reactor 510 having a residual oil-to-plastic mass flow ratio ranging between about 0.01 and about 100 at SATP, alternately between about 0.05 and about 10 at SATP, or alternately between about 0.1 and about 1 at SATP. In at least one embodiment, the residual oil-to-plastic mass flow ratio is about 0.5.

The first stage reactor 510 is maintained at a temperature and pressure such that the water is in its supercritical state. The first stage reactor 510 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 510 is maintained at a temperature ranging between about 380 deg. C. and about 420 deg. C. Means for maintaining such temperature of the first stage reactor 510 can include a strip heater, immersion heater, tubular furnace, heat exchanger, or like devices known in the art. The first stage reactor 510 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 510 is maintained at a pressure ranging between about 27 MPa and about 35 MPa. The first stage reactor 510 can be a tubular type reactor, a vessel type reactor, a CSTR, and combinations of the same. In at least one embodiment, the first stage reactor 510 is a CSTR. The water, the plastic material, the sulfur additive, and the residual oil can have a residence time in the first stage reactor 510 ranging between about 0.1 min and about 60 min, alternately between about 1 min and about 45 min, or alternately between about 2 min and about 30 min. In at least one embodiment the residence time of the water, the plastic material, the sulfur additive, and the residual oil in the first stage reactor 510 ranges between about 2 min and 30 min. The residence time is calculated by assuming that the densities of the reactants in the first stage reactor 510 are similar to that of water at operating conditions of the first stage reactor 510. In at least one embodiment, the first stage reactor 510 is in the absence of an external supply of catalyst. In at least one embodiment, the first stage reactor 510 is in the absence of an external supply of hydrogen. The product of the first stage reactor 510 is collected via an effluent stream 550.

Unreacted solid components from the first stage reactor 510 are separated from the effluent stream 550. By using any type of separation device capable of separating solid components from the effluent stream 550, any residual solid components (such as unreacted plastic material, coke, and char) in the effluent stream 550 are collected via the waste stream 555 to produce a feed stream 560. The feed stream 560 includes fluid components from the first stage reactor 510 only.

The feed stream 560 is introduced to the second stage reactor 520. The second stage reactor 520 is maintained at a temperature and pressure such that the water is in its supercritical state. The temperature of the second stage reactor 520 is greater than that of the first stage reactor 510. The second stage reactor 520 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 520 is maintained at a temperature ranging between about 420 deg. C. and about 470 deg. C. Means for maintaining such temperature of the second stage reactor 520 can include a strip heater, immersion heater, tubular furnace, heat exchanger, or like devices known in the art. The pressure of the second stage reactor 520 is less than that of the first stage reactor 510. The second stage reactor 520 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 520 is maintained at a pressure ranging between about 24 MPa and about 27 MPa. The second stage reactor 520 can be a tubular type reactor, a vessel type reactor, a CSTR, and combinations of the same. In at least one embodiment, the second stage reactor 520 is a tubular type reactor. In at least one embodiment, the second stage reactor 520 is a vessel type reactor. The components of the feed stream 560 can have a residence time in the second stage reactor 520 ranging between about 0.1 min and about 40 min, alternately between about 0.5 min and about 30 min, or alternately between about 1 min and about 20 min. In at least one embodiment the residence time of the components of the feed stream 560 in the second stage reactor 520 ranges between about 1 min and about 20 min. The residence time is calculated by assuming that the densities of the reactants in the second stage reactor 520 are similar to that of water at operating conditions of the second stage reactor 520. In at least one embodiment, the second stage reactor 520 is in the absence of an external supply of catalyst. In at least one embodiment, the second stage reactor 520 is in the absence of an external supply of hydrogen. The product of the second stage reactor 520 is collected via a product stream 570.

Figure 6:
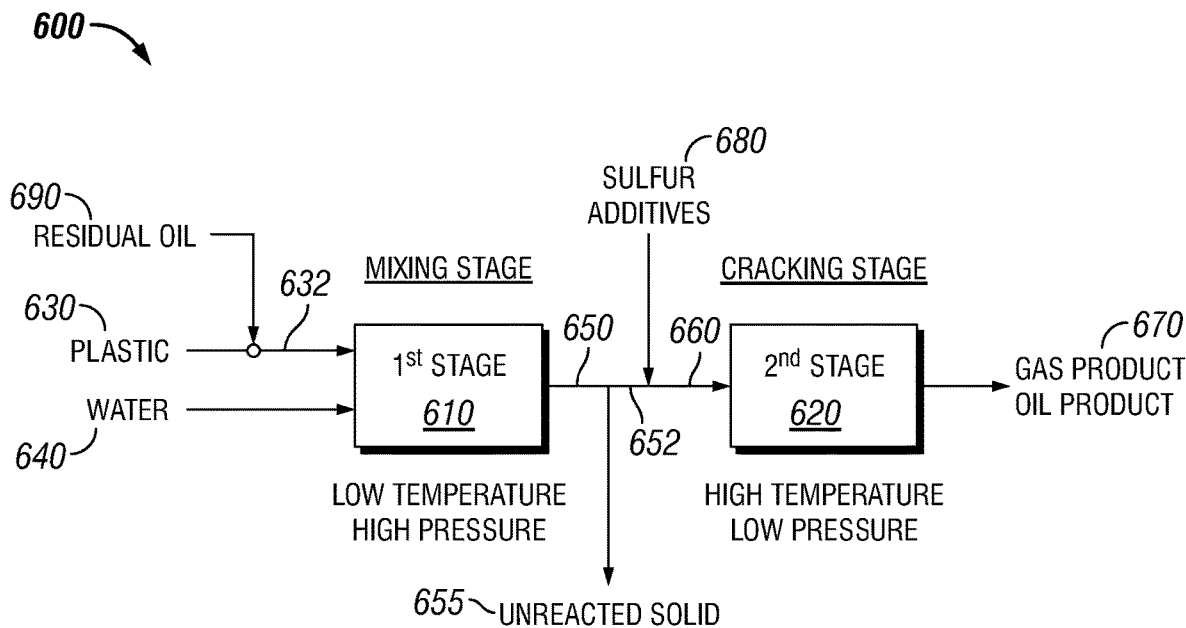
FIG. 6 is a schematic diagram of a process for recycling polymers according to an embodiment of the disclosure.

FIG. 6 shows a schematic diagram of a process 600 for recycling polymers. The process 600 can include a first stage reactor 610 and a second stage reactor 620.

A plastic feed 630 is introduced to the first stage reactor 610. A water feed 640 is introduced to the first stage reactor 610. A residual oil feed 690 is introduced to the first stage reactor 610. The residual oil feed 690 is combined with the plastic feed 630 to produce a mixed feed 632 using any type of mixing device capable of mixing the residual oil feed 690 and the plastic feed 630, such as a tee junction, a static mixer, an inline mixer, and impeller-embedded mixer. In some embodiments, the water feed 640 and the mixed feed 632 can be premixed before being introduced to the first stage reactor 610 using any type of mixing device capable of mixing water feed 640 and the mixed feed 632, such as a tee junction, a static mixer, an inline mixer, and impeller-embedded mixer. In other embodiments, the water feed 640 and the mixed feed 632 are separately introduced to the first stage reactor 610. The water feed 640 and the mixed feed 632 are introduced to the first stage reactor 610 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products. The water feed 640 and the mixed feed 632 are introduced to the first stage reactor 610 having a residual oil-to-plastic mass flow ratio ranging between about 0.01 and about 100 at SATP, alternately between about 0.05 and about 10 at SATP, or alternately between about 0.1 and about 1 at SATP. In at least one embodiment, the residual oil-to-plastic mass flow ratio is about 0.5.

The first stage reactor 610 is maintained at a temperature and pressure such that the water is in its supercritical state. The first stage reactor 610 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 610 is maintained at a temperature ranging between about 380 deg. C. and about 420 deg. C. Means for maintaining such temperature of the first stage reactor 610 can include a strip heater, immersion heater, tubular furnace, heat exchanger, or like devices known in the art. The first stage reactor 610 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 610 is maintained at a pressure ranging between about 27 MPa and about 35 MPa. The first stage reactor 610 can be a tubular type reactor, a vessel type reactor, a CSTR, and combinations of the same. In at least one embodiment, the first stage reactor 610 is a CSTR. The water, the plastic material, and the residual oil can have a residence time in the first stage reactor 610 ranging between about 0.1 min and about 60 min, alternately between about 1 min and about 45 min, or alternately between about 2 min and about 30 min. In at least one embodiment the residence time of the water, the plastic material, and the residual oil in the first stage reactor 610 ranges between about 2 min and 30 min. The residence time is calculated by assuming that the densities of the reactants in the first stage reactor 610 are similar to that of water at operating conditions of the first stage reactor 610. In at least one embodiment, the first stage reactor 610 is in the absence of an external supply of catalyst. In at least one embodiment, the first stage reactor 610 is in the absence of an external supply of hydrogen. The product of the first stage reactor 610 is collected via an effluent stream 650.

Unreacted solid components from the first stage reactor 610 are separated from the effluent stream 650. By using any type of separation device capable of separating solid components from the effluent stream 650, any residual solid components (such as unreacted plastic material, coke, and char) in the effluent stream 650 are collected via the waste stream 655 to produce a fluid stream 652.

A sulfur additive feed 680 is introduced to the process 600. The sulfur additive feed 680 is combined with the fluid stream 652 to produce a feed stream 660 using any type of mixing device such as a tee junction, a static mixer, an inline mixer, and impeller-embedded mixer. The feed stream 660 includes fluid components from the first stage reactor 610 and the sulfur additive.

The feed stream 660 is introduced to the second stage reactor 620. The second stage reactor 620 is maintained at a temperature and pressure such that the water is in its supercritical state. The temperature of the second stage reactor 620 is greater than that of the first stage reactor 610. The second stage reactor 620 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 620 is maintained at a temperature ranging between about 420 deg. C. and about 470 deg. C. Means for maintaining such temperature of the second stage reactor 620 can include a strip heater, immersion heater, tubular furnace, heat exchanger, or like devices known in the art. The pressure of the second stage reactor 620 is less than that of the first stage reactor 610. The second stage reactor 620 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 620 is maintained at a pressure ranging between about 24 MPa and about 27 MPa. The second stage reactor 620 can be a tubular type reactor, a vessel type reactor, a CSTR, and combinations of the same. In at least one embodiment, the second stage reactor 620 is a tubular type reactor. In at least one embodiment, the second stage reactor 620 is a vessel type reactor. The components of the feed stream 660 can have a residence time in the second stage reactor 620 ranging between about 0.1 min and about 40 min, alternately between about 0.5 min and about 30 min, or alternately between about 1 min and about 20 min. In at least one embodiment the residence time of the components of the feed stream 660 in the second stage reactor 620 ranges between about 1 min and about 20 min. The residence time is calculated by assuming that the densities of the reactants in the second stage reactor 620 are similar to that of water at operating conditions of the second stage reactor 620. In at least one embodiment, the second stage reactor 620 is in the absence of an external supply of catalyst. In at least one embodiment, the second stage reactor 620 is in the absence of an external supply of hydrogen. The product of the second stage reactor 620 is collected via a product stream 670. The feed stream 660 is introduced to the second stage reactor 620 having a sulfur additive-to-plastic mass flow ratio ranging between about $10^{-5}$ and about 100 at SATP, alternately between about $10^{-4}$ and about 10 at SATP, or alternately between about $10^{-3}$ and about 1 at SATP. In at least one embodiment, the sulfur additive-to-plastic mass flow ratio is about 0.007.

Figure 7:
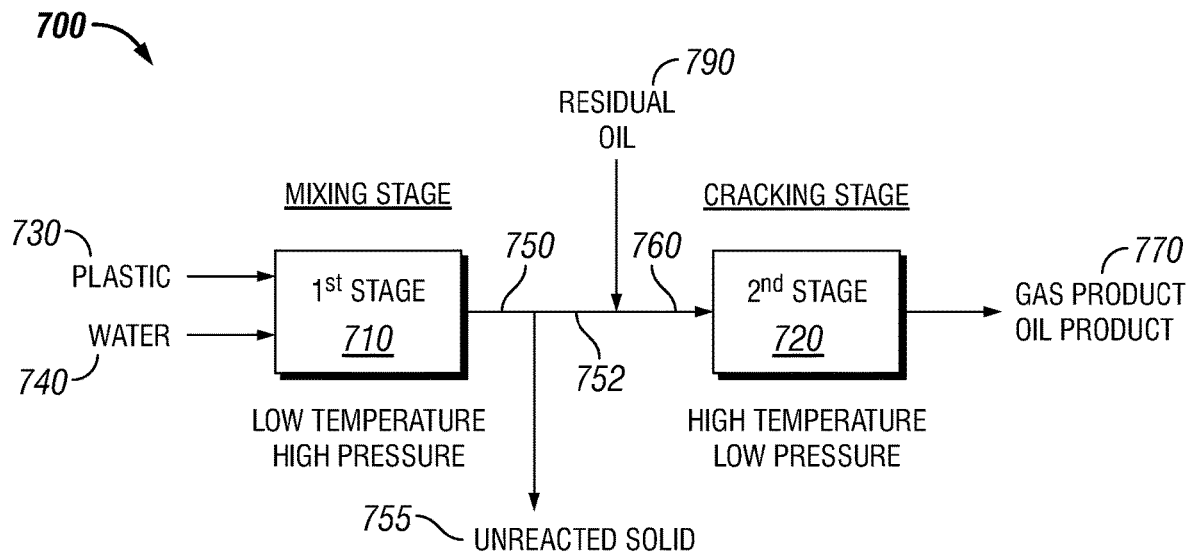
FIG. 7 is a schematic diagram of a process for recycling polymers according to an embodiment of the disclosure.

FIG. 7 shows a schematic diagram of a process 700 for recycling polymers. The process 700 can include a first stage reactor 710 and a second stage reactor 720.

A plastic feed 730 is introduced to the first stage reactor 710. A water feed 740 is introduced to the first stage reactor 710. In some embodiments, the plastic feed 730 and the water feed 740 can be premixed before being introduced to the first stage reactor 710 using any type of mixing device capable of mixing the plastic feed 730 and the water feed 740, such as a tee junction, a static mixer, an inline mixer, and impeller-embedded mixer. In other embodiments, the plastic feed 730 and the water feed 740 are separately introduced to the first stage reactor 710. The plastic feed 730 and the water feed 740 are introduced to the first stage reactor 710 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products.

The first stage reactor 710 is maintained at a temperature and pressure such that the water is in its supercritical state. The first stage reactor 710 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 710 is maintained at a temperature ranging between about 380 deg. C. and about 420 deg. C. Means for maintaining such temperature of the first stage reactor 710 can include a strip heater, immersion heater, tubular furnace, heat exchanger, or like devices known in the art. The first stage reactor 710 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 710 is maintained at a pressure ranging between about 27 MPa and about 35 MPa. The first stage reactor 710 can be a tubular type reactor, a vessel type reactor, a CSTR, and combinations of the same. In at least one embodiment, the first stage reactor 710 is a CSTR. The water and the plastic material can have a residence time in the first stage reactor 710 ranging between about 0.1 min and about 60 min, alternately between about 1 min and about 45 min, or alternately between about 2 min and about 30 min. In at least one embodiment the residence time of the water and the plastic material in the first stage reactor 710 ranges between about 2 min and 30 min. The residence time is calculated by assuming that the densities of the reactants in the first stage reactor 710 are similar to that of water at operating conditions of the first stage reactor 710. In at least one embodiment, the first stage reactor 710 is in the absence of an external supply of catalyst. In at least one embodiment, the first stage reactor 710 is in the absence of an external supply of hydrogen. The product of the first stage reactor 710 is collected via an effluent stream 750.

Unreacted solid components from the first stage reactor 710 are separated from the effluent stream 750. By using any type of separation device capable of separating solid components from the effluent stream 750, any residual solid components (such as unreacted plastic material, coke, and char) in the effluent stream 750 are collected via the waste stream 755 to produce a fluid stream 752.

A residual oil feed 790 is introduced to the process 700. The residual oil feed 790 is combined with the fluid stream 752 to produce a feed stream 760 using any type of mixing device such as a tee junction, a static mixer, an inline mixer, and impeller-embedded mixer. The feed stream 760 includes fluid components from the first stage reactor 710 and the residual oil.

The feed stream 760 is introduced to the second stage reactor 720. The second stage reactor 720 is maintained at a temperature and pressure such that the water is in its supercritical state. The temperature of the second stage reactor 720 is greater than that of the first stage reactor 710. The second stage reactor 720 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 720 is maintained at a temperature ranging between about 420 deg. C. and about 470 deg. C. Means for maintaining such temperature of the second stage reactor 720 can include a strip heater, immersion heater, tubular furnace, heat exchanger, or like devices known in the art. The pressure of the second stage reactor 720 is less than that of the first stage reactor 710. The second stage reactor 720 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 720 is maintained at a pressure ranging between about 24 MPa and about 27 MPa. The second stage reactor 720 can be a tubular type reactor, a vessel type reactor, a CSTR, and combinations of the same. In at least one embodiment, the second stage reactor 720 is a tubular type reactor. In at least one embodiment, the second stage reactor 720 is a vessel type reactor. The components of the feed stream 760 can have a residence time in the second stage reactor 720 ranging between about 0.1 min and about 40 min, alternately between about 0.5 min and about 30 min, or alternately between about 1 min and about 20 min. In at least one embodiment the residence time of the components of the feed stream 760 in the second stage reactor 720 ranges between about 1 min and about 20 min. The residence time is calculated by assuming that the densities of the reactants in the second stage reactor 720 are similar to that of water at operating conditions of the second stage reactor 720. In at least one embodiment, the second stage reactor 720 is in the absence of an external supply of catalyst. In at least one embodiment, the second stage reactor 720 is in the absence of an external supply of hydrogen. The product of the second stage reactor 720 is collected via a product stream 770. The feed stream 760 is introduced to the second stage reactor 720 having a residual oil-to-plastic mass flow ratio ranging between about 0.01 and about 100 at SATP, alternately between about 0.05 and about 10 at SATP, or alternately between about 0.1 and about 1 at SATP. In at least one embodiment, the residual oil-to-plastic mass flow ratio is about 0.5.

Figure 8:
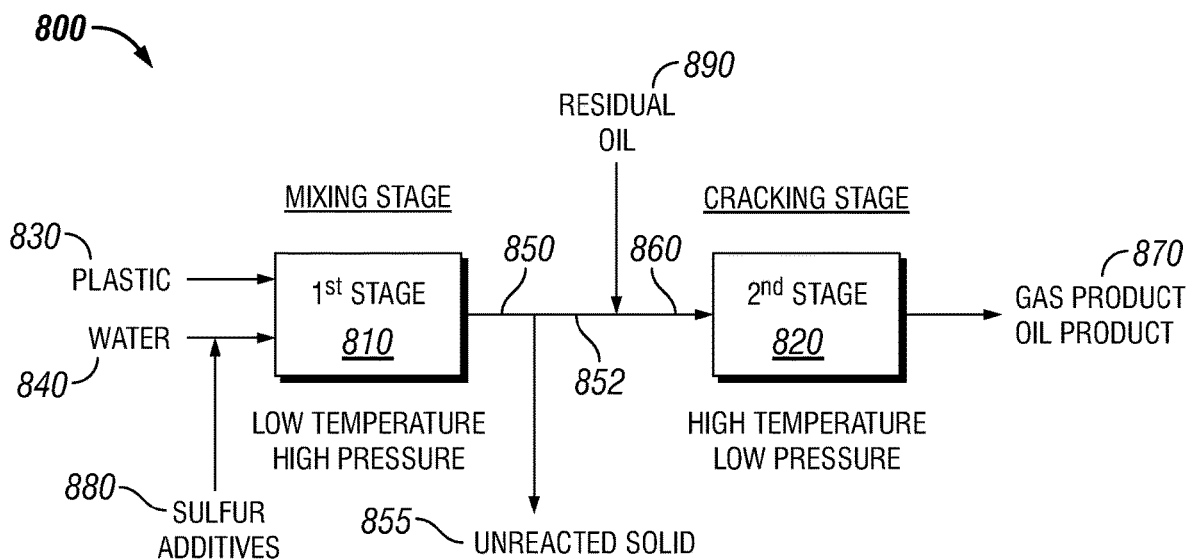
FIG. 8 is a schematic diagram of a process for recycling polymers according to an embodiment of the disclosure.

FIG. 8 shows a schematic diagram of a process 800 for recycling polymers. The process 800 can include a first stage reactor 810 and a second stage reactor 820.

A plastic feed 830 is introduced to the first stage reactor 810. A water feed 840 is introduced to the first stage reactor 810. A sulfur additive feed 880 is introduced to the first stage reactor 810. The sulfur additive feed 880 is combined with the water feed 840 to produce a mixed feed 842 using any type of mixing device capable of mixing the sulfur additive feed 880 and the water feed 840, such as a tee junction, a static mixer, an inline mixer, and impeller-embedded mixer. In some embodiments, the plastic feed 830 and the mixed feed 842 can be premixed before being introduced to the first stage reactor 810 using any type of mixing device capable of mixing the plastic feed 830 and the mixed feed 842, such as a tee junction, a static mixer, an inline mixer, and impeller-embedded mixer. In other embodiments, the plastic feed 830 and the mixed feed 842 are separately introduced to the first stage reactor 810. The plastic feed 830 and the mixed feed 842 are introduced to the first stage reactor 810 having a water-to-plastic mass flow ratio ranging between about 1 and about 20 at SATP, alternately between about 3 and about 15 at SATP, or alternately between about 5 and about 10 at SATP. In at least one embodiment, the water-to-plastic mass flow ratio is about 9. Such water-to-feed mass flow ratio can be greater than a typical oil upgrading application, which is typically in the range of between about 0.2 and about 4 or alternately between about 0.5 and 2. Advantageously, such water-to-plastic mass flow ratio ensures the plastic material to be well dispersed in abundant supercritical water. Advantageously, such water-to-plastic mass flow ratio enhances swelling of the plastic material in the presence of abundant supercritical water. Advantageously, such water-to-plastic mass flow ratio prevents instances of intermolecular interactions between product hydrocarbons and the plastic material, which may result in forming undesired products. The plastic feed 830 and the mixed feed 842 are introduced to the first stage reactor 810 having a sulfur additive-to-plastic mass flow ratio ranging between about $10^{-5}$ and about 100 at SATP, alternately between about $10^{-4}$ and about 10 at SATP, or alternately between about $10^{-3}$ and about 1 at SATP. In at least one embodiment, the sulfur additive-to-plastic mass flow ratio is about 0.007.

The first stage reactor 810 is maintained at a temperature and pressure such that the water is in its supercritical state.

The first stage reactor 810 can be maintained at a temperature ranging between about 374 deg. C. and about 450 deg. C., alternately between about 380 deg. C. and about 430 deg. C., or alternately between about 380 deg. C. and about 420 deg. C. In at least one embodiment, the first stage reactor 810 is maintained at a temperature ranging between about 380 deg. C. and about 420 deg. C. Means for maintaining such temperature of the first stage reactor 810 can include a strip heater, immersion heater, tubular furnace, heat exchanger, or like devices known in the art. The first stage reactor 810 can be maintained at a pressure ranging between about 22.06 MPa and about 50 MPa, alternately between about 25 MPa and about 40 MPa, or alternately between about 27 MPa and about 35 MPa. In at least one embodiment, the first stage reactor 810 is maintained at a pressure ranging between about 27 MPa and about 35 MPa. The first stage reactor 810 can be a tubular type reactor, a vessel type reactor, a CSTR, and combinations of the same. In at least one embodiment, the first stage reactor 810 is a CSTR. The water, the plastic material, and the sulfur additive can have a residence time in the first stage reactor 810 ranging between about 0.1 min and about 60 min, alternately between about 1 min and about 45 min, or alternately between about 2 min and about 30 min. In at least one embodiment the residence time of the water, the plastic material, and the sulfur additive in the first stage reactor 810 ranges between about 2 min and 30 min. The residence time is calculated by assuming that the densities of the reactants in the first stage reactor 810 are similar to that of water at operating conditions of the first stage reactor 810. In at least one embodiment, the first stage reactor 810 is in the absence of an external supply of catalyst. In at least one embodiment, the first stage reactor 810 is in the absence of an external supply of hydrogen. The product of the first stage reactor 810 is collected via an effluent stream 850.

Unreacted solid components from the first stage reactor 810 are separated from the effluent stream 850. By using any type of separation device capable of separating solid components from the effluent stream 850, any residual solid components (such as unreacted plastic material, coke, and char) in the effluent stream 850 are collected via the waste stream 855 to produce a fluid stream 852.

A residual oil feed 890 is introduced to the process 800. The residual oil feed 890 is combined with the fluid stream 852 to produce a feed stream 860 using any type of mixing device such as a tee junction, a static mixer, an inline mixer, and impeller-embedded mixer. The feed stream 860 includes fluid components from the first stage reactor 810 and the residual oil.

The feed stream 860 is introduced to the second stage reactor 820. The second stage reactor 820 is maintained at a temperature and pressure such that the water is in its supercritical state. The temperature of the second stage reactor 820 is greater than that of the first stage reactor 810. The second stage reactor 820 can be maintained at a temperature ranging between about 400 deg. C. and about 500 deg. C., alternately between about 410 deg. C. and about 480 deg. C., or alternately between about 420 deg. C. and about 470 deg. C. In at least one embodiment, the second stage reactor 820 is maintained at a temperature ranging between about 420 deg. C. and about 470 deg. C. Means for maintaining such temperature of the second stage reactor 820 can include a strip heater, immersion heater, tubular furnace, heat exchanger, or like devices known in the art. The pressure of the second stage reactor 820 is less than that of the first stage reactor 810. The second stage reactor 820 can be maintained at a pressure ranging between about 22.06 MPa and about 35 MPa, alternately between about 23 MPa and about 30 MPa, or alternately between about 24 MPa and about 27 MPa. In at least one embodiment, the second stage reactor 820 is maintained at a pressure ranging between about 24 MPa and about 27 MPa. The second stage reactor 820 can be a tubular type reactor, a vessel type reactor, a CSTR, and combinations of the same. In at least one embodiment, the second stage reactor 820 is a tubular type reactor. In at least one embodiment, the second stage reactor 820 is a vessel type reactor. The components of the feed stream 860 can have a residence time in the second stage reactor 820 ranging between about 0.1 min and about 40 min, alternately between about 0.5 min and about 30 min, or alternately between about 1 min and about 20 min. In at least one embodiment the residence time of the components of the feed stream 860 in the second stage reactor 820 ranges between about 1 min and about 20 min. The residence time is calculated by assuming that the densities of the reactants in the second stage reactor 820 are similar to that of water at operating conditions of the second stage reactor 820. In at least one embodiment, the second stage reactor 820 is in the absence of an external supply of catalyst. In at least one embodiment, the second stage reactor 820 is in the absence of an external supply of hydrogen. The product of the second stage reactor 820 is collected via a product stream 870. The feed stream 860 is introduced to the second stage reactor 820 having a residual oil-to-plastic mass flow ratio ranging between about 0.01 and about 100 at SATP, alternately between about 0.05 and about 10 at SATP, or alternately between about 0.1 and about 1 at SATP. In at least one embodiment, the residual oil-to-plastic mass flow ratio is about 0.5.

Figure 9:
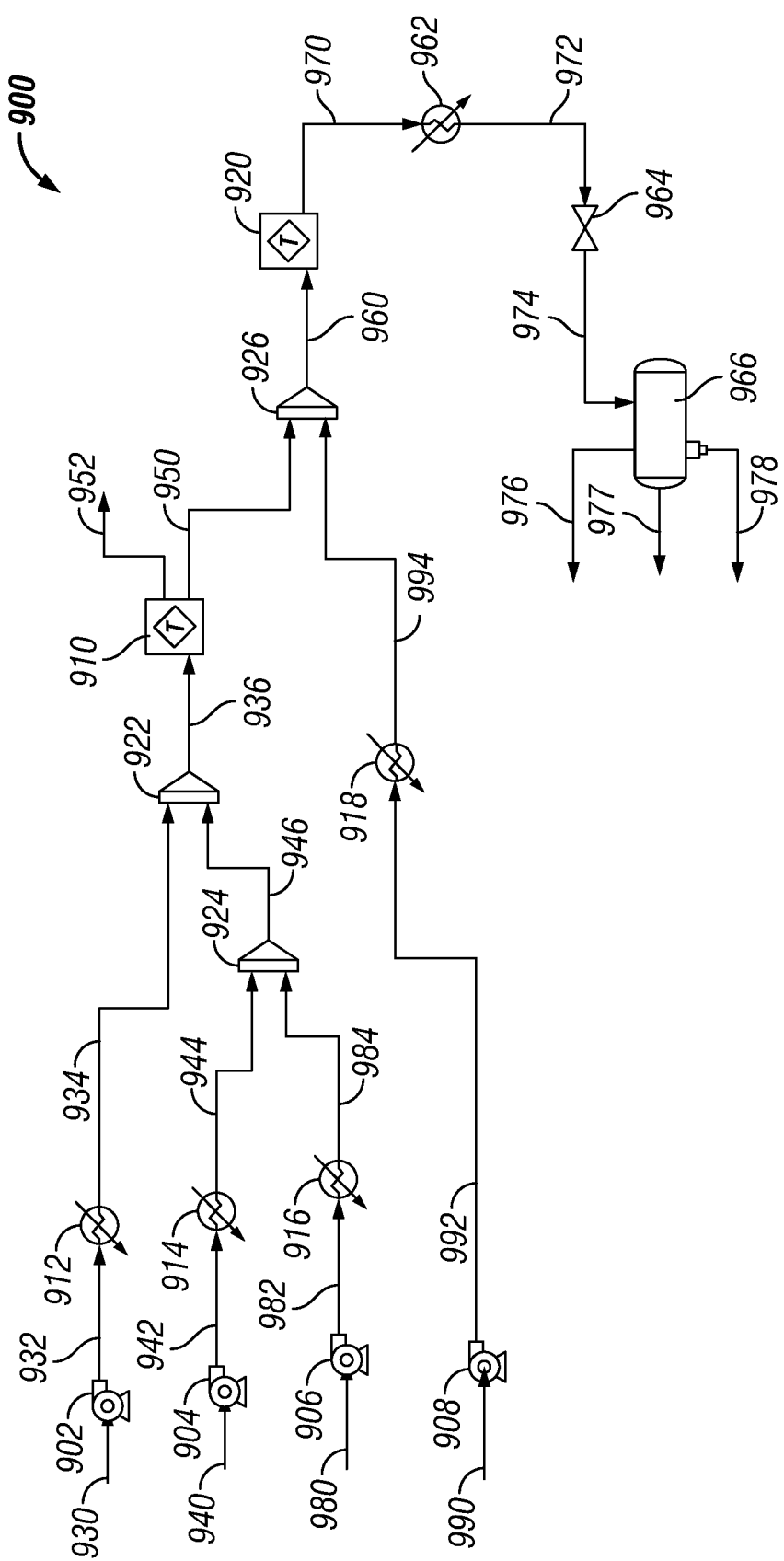
FIG. 9 is a schematic diagram of a process for recycling polymers according to an embodiment of the disclosure.

FIG. 9 shows a schematic diagram of a process 900 for recycling polymers. The process 900 can include pumps 902, 904, 906, 908, heat exchangers 912, 914, 916, 918, 962, mixers 922, 924, 926, a first stage reactor 910, a second stage reactor 920, a pressure reducer 964, and a separator 966.

A plastic feed 930 is introduced to the process 900. The plastic feed 930 is passed to the pump 902. The pump 902 can be any type of pump capable of increasing the pressure of the plastic feed 930. In at least one embodiment, the pump 902 is a diaphragm metering pump. The pressure of the plastic feed 930 is increased in the pump 902 to produce a plastic stream 932. The pressure of the plastic stream 932 can range between about 27 MPa and about 35 MPa. In at least one embodiment, the pressure of the plastic stream 932 is about 29 MPa.

The plastic stream 932 is passed to the heat exchanger 912. The heat exchanger 912 can be any type of heat exchanger capable of increasing the temperature of the plastic stream 932. Non-limiting examples of the heat exchanger 912 can include an electric heater, a fired heater, and a cross exchanger. The temperature of the plastic stream 932 is increased in the heat exchanger 912 to produce a plastic stream 934. The temperature of the plastic stream 934 can range between about 80 deg. C. and about 160 deg. C. In at least one embodiment, the temperature of the plastic stream 934 is about 120 deg. C.

A water feed 940 is introduced to the process 900. The water feed 940 is passed to the pump 904. The pump 904 can be any type of pump capable of increasing the pressure of the water feed 940. In at least one embodiment, the pump 904 is a diaphragm metering pump. The pressure of the water feed 940 is increased in the pump 904 to produce a water stream 942. The pressure of the water stream 942 can range between about 27 MPa and about 35 MPa. In at least one embodiment, the pressure of the water stream 942 is about 29 MPa.

The water stream 942 is passed to the heat exchanger 914. The heat exchanger 914 can be any type of heat exchanger capable of increasing the temperature of the water stream 942. Non-limiting examples of the heat exchanger 914 can include an electric heater, a fired heater, and a cross exchanger. The temperature of the water stream 942 is increased in the heat exchanger 914 to produce a water stream 944. The temperature of the water stream 944 can range between about 380 deg. C. and about 430 deg. C. In at least one embodiment, the temperature of the water stream 944 is about 410 deg. C.

A sulfur additive feed 980 is introduced to the process 900. The sulfur additive feed 980 is passed to the pump 906. The pump 906 can be any type of pump capable of increasing the pressure of the sulfur additive feed 980. In at least one embodiment, the pump 906 is a diaphragm metering pump. The pressure of the sulfur additive feed 980 is increased in the pump 906 to produce a sulfur additive stream 982. The pressure of the sulfur additive stream 982 can range between about 27 MPa and about 35 MPa. In at least one embodiment, the pressure of the sulfur additive stream 982 is about 29 MPa.

The sulfur additive stream 982 is passed to the heat exchanger 916. The heat exchanger 916 can be any type of heat exchanger capable of increasing the temperature of the sulfur additive stream 982. Non-limiting examples of the heat exchanger 916 can include an electric heater, a fired heater, and a cross exchanger. The temperature of the sulfur additive stream 982 is increased in the heat exchanger 916 to produce a sulfur additive stream 984. The temperature of the sulfur additive stream 984 can range between about 100 deg. C. and about 200 deg. C. In at least one embodiment, the temperature of the sulfur additive stream 984 is about 150 deg. C.

The water stream 944 and the sulfur additive stream 984 are passed to the mixer 924 to produce a first mixed stream 946. The mixer 924 can be any type of mixing device capable of mixing the water stream 944 and the sulfur additive stream 984. Non-limiting examples of mixing devices suitable for use as the mixer 924 can include a static mixer, an inline mixer, and impeller-embedded mixer.

The plastic stream 934 and the first mixed stream 946 are passed to the mixer 922 to produce a second mixed stream 936. The mixer 922 can be any type of mixing device capable of mixing the plastic stream 934 and the first mixed stream 946. Non-limiting examples of mixing devices suitable for use as the mixer 922 can include a static mixer, an inline mixer, and impeller-embedded mixer.

The second mixed stream 936 is introduced to the first stage reactor 910. The second mixed stream 936 is introduced to the first stage reactor 910 having a water-to-plastic mass flow ratio ranging between about 5 and about 10 at SATP. In at least one embodiment, the water-to-plastic mass flow ratio is about 9. The second mixed stream 936 is introduced to the first stage reactor 910 having a sulfur additive-to-plastic mass flow ratio ranging between about $10^{-3}$ and about 1 at SATP. In at least one embodiment, the sulfur additive-to-plastic mass flow ratio is about 0.007.

The first stage reactor 910 is maintained at a temperature and pressure such that the water is in its supercritical state. The first stage reactor 910 is maintained at a temperature ranging between about 380 deg. C. and about 420 deg. C. In at least one embodiment, the first stage reactor 910 is maintained at a temperature of about 390 deg. C. Means for maintaining such temperature of the first stage reactor 910 can include a strip heater, immersion heater, tubular furnace, heat exchanger, or like devices known in the art. The first stage reactor 910 is maintained at a pressure ranging between about 27 MPa and about 35 MPa. In at least one embodiment, the first stage reactor 910 is maintained at a pressure of about 29 MPa. The first stage reactor 910 is a CSTR. The water, the plastic material, and the sulfur additive have a residence time in the first stage reactor 910 ranging between about 2 min and about 30 min. The product of the first stage reactor 910 is collected via an effluent stream 950. Unreacted plastic material and other solid components (such as coke and char) from the first stage reactor 910 are collected via a waste stream 952. In at least one embodiment, a cyclone-type separator is used to separate the effluent stream 950 and the waste stream 952.

A residual oil feed 990 is introduced to the process 900. The residual oil feed 990 is passed to the pump 908. The pump 908 can be any type of pump capable of increasing the pressure of the residual oil feed 990. In at least one embodiment, the pump 908 is a diaphragm metering pump. The pressure of the residual oil feed 990 is increased in the pump 908 to produce a residual oil stream 992. The pressure of the residual oil stream 992 can range between about 24 MPa and about 27 MPa. In at least one embodiment, the pressure of the residual oil stream 992 is about 25.3 MPa.

The residual oil stream 992 is passed to the heat exchanger 918. The heat exchanger 918 can be any type of heat exchanger capable of increasing the temperature of the residual oil stream 992. Non-limiting examples of the heat exchanger 918 can include an electric heater, a fired heater, and a cross exchanger. The temperature of the residual oil stream 992 is increased in the heat exchanger 918 to produce a residual oil stream 994. The temperature of the residual oil stream 994 can range between about 100 deg. C. and about 300 deg. C. In at least one embodiment, the temperature of the residual oil stream 994 is about 200 deg. C.

The effluent stream 950 and the residual oil stream 994 are passed to the mixer 926 to produce a feed stream 960. The mixer 926 can be any type of mixing device capable of mixing the effluent stream 950 and the residual oil stream 994. Non-limiting examples of mixing devices suitable for use as the mixer 926 can include a static mixer, an inline mixer, and impeller-embedded mixer.

The feed stream 960 is introduced to the second stage reactor 920. The feed stream 960 is introduced to the second stage reactor 920 having a residual oil-to-plastic mass flow ratio ranging between about 0.1 and about 1 at SATP. In at least one embodiment, the residual oil-to-plastic mass flow ratio is about 0.5.

The second stage reactor 920 is maintained at a temperature and pressure such that the water is in its supercritical state. The temperature of the second stage reactor 920 is greater than that of the first stage reactor 910. The second stage reactor 920 is maintained at a temperature ranging between about 420 deg. C. and about 470 deg. C. In at least one embodiment, the second stage reactor 920 is maintained at a temperature of about 450 deg. C. Means for maintaining such temperature of the second stage reactor 920 can include a strip heater, immersion heater, tubular furnace, heat exchanger, or like devices known in the art. The pressure of the second stage reactor 920 is less than that of the first stage reactor 910. The second stage reactor 920 is maintained at a pressure ranging between about 24 MPa and about 27 MPa. In at least one embodiment, the second stage reactor 920 is maintained at a pressure of about 25.3 MPa. The second stage reactor 920 is a tubular type reactor or a vessel type reactor. The components of the feed stream 960 have a residence time in the second stage reactor 920 ranging between about 1 min and about 20 min. The product of the second stage reactor 920 is collected via a product stream 970.

The product stream 970 is passed to heat exchanger 962. The heat exchanger 962 can be any type of heat exchange device capable of reducing the temperature of the product stream 970. Non-limiting examples of the heat exchanger 962 can include a double pipe type exchanger and shell-and-tube type exchanger. The temperature of the product stream 970 is reduced in heat exchanger 962 to produce a cooled product stream 972. The temperature of the cooled product stream 972 can range between about 0 deg. C. and about 150 deg. C., alternately between about 50 deg. C. and about 130 deg. C., or alternately between about 80 deg. C. and about 120 deg. C. In at least one embodiment, the temperature of the cooled product stream 972 is about 97 deg. C.

The cooled product stream 972 is passed to the pressure reducer 964. The pressure reducer 964 can be any type of device capable of reducing the pressure of a fluid stream. Non-limiting examples of the pressure reducer 964 can include a pressure let-down valve, a pressure control valve, and a back pressure regulator. The pressure of the cooled product stream 972 is reduced in the pressure reducer 964 to produce a depressurized product stream 974. The pressure of the depressurized product stream 974 can range between about 0.01 MPa and about 10 MPa, alternately between about 0.1 MPa and about 7 MPa, or alternately between about 1 MPa and about 5 MPa. In at least one embodiment, the pressure of the depressurized product stream 974 is about 3.4 MPa.

The depressurized product stream 974 is introduced to the separator 966. The separator 966 can be any type of separation device capable of separating a fluid stream into a gas phase stream, a hydrocarbon-containing stream, and a water stream. In some embodiments, the separator 966 is a combination of a gas-liquid separator and an oil-water separator. The depressurized product stream 974 is separated to produce a gas product stream 976, a liquid product stream 977, and a water product stream 978.

Example

The disclosure is illustrated by the following examples, which are presented for illustrative purposes only, and are not intended as limiting the scope of the invention which is defined by the appended claims.

A process having a configuration similar to FIG. 9 was modelled using the HYSYS Hydroprocessing Model (Aspen Technology, Inc., Bedford Mass.). In reference to the properties of the stream for EXAMPLE, the description and stream numbers for FIG. 9 is used.

A plastic feed (stream 930) was introduced to the respective process. The plastic feed had a melt mass flow rate of about 9 g/10 min at about 190 deg. C. The melt mass flow rate was measured with a 21.6 kilogram (kg) load pursuant to the ISO 1133 standard. The plastic feed was introduced to the respective process at a mass flow rate of about 100.0 kilograms per hour (kg/h). The plastic feed included polyethylene (as purchased) having a density of about 0.952 g/cm³. The pressure of the plastic feed was maintained at about 29 MPa (stream 932). The temperature of the plastic feed was maintained at about 120 deg. C. (stream 934).

A water feed (stream 940) was introduced to the respective process at a mass flow rate of about 900.0 kg/h. The water was a demineralized water and had a conductivity of less than about 0.2 μS/cm, a sodium content of less than about 0.1 μg/L, a chloride content of less than about 1 μg/L, and a silica content of less than about 3 μg/L. The pressure of the water feed was maintained at about 29 MPa (stream 942). The temperature of the water feed was maintained at about 410 deg. C. (stream 944).

A sulfur additive feed (stream 980) was introduced to the respective process at a mass flow rate of about 0.7 kg/h. The sulfur additive was a mixture of sulfur-containing hydrocarbons and aromatics. The sulfur-containing hydrocarbons included aliphatic thiols and aliphatic sulfides such as butanethiol, hexanethiol, and dihexyl sulfide. The total sulfur content of the sulfur additive was about 7.8 wt. %. The aromatics were a mixture of toluene, mixed xylenes, and benzene. The pressure of the sulfur additive feed was maintained at about 29 MPa (stream 982). The temperature of the sulfur additive feed was maintained at about 150 deg. C. (stream 984).

The water feed and the sulfur additive feed were combined to form a first mixed stream (stream 946). The pressure of the first mixed stream was maintained at about 29 MPa. The temperature of the first mixed stream was maintained at about 405 deg. C. The first mixed stream had a mass flow rate of about 900.7 kg/h.

The plastic feed and the first mixed stream were combined to form a second mixed stream (stream 936). The pressure of the second mixed stream was maintained at about 29 MPa. The temperature of the second mixed stream was maintained at about 389 deg. C. The second mixed stream had a mass flow rate of about 1000.7 kg/h.

The second mixed stream was introduced to a first stage reactor (unit 910). The first stage reactor was a CSTR having an internal volume of about 320 liters. A set of impellers were placed in the first stage reactor for internal mixing. The first stage reactor was maintained at a temperature of about 390 deg. C. and a pressure of about 29 MPa. The first stage reactor produced an unreacted solid plastic stream (stream 952) and an effluent stream (stream 950). The unreacted solid plastic stream included unreacted plastic material and other solid components (such as coke and char) from the first stage reactor which were separated from the effluent stream using a cyclone-type separator. The effluent stream had a temperature of about 390 deg. C. and a pressure of about 25.3 MPa. The effluent stream had a mass flow rate of about 981.8 kg/hr.

A residual oil feed (stream 990) was introduced to the respective process at a mass flow rate of about 50.0 kg/h. The residual oil was an atmospheric residue from a crude distillation unit having a composition as shown in Table 1. The pressure of the residual oil feed was maintained at about 25.3 MPa (stream 992). The temperature of the residual oil feed was maintained at about 200 deg. C. (stream 994).

TABLE 1

| | |
|---|---|
| API Gravity | 13.65 |
| Sulfur Content (wt. %) | 3.95 |
| Distillation Properties (deg. C.) | |
| TBP 5% | 359 |
| TBP 10% | 388 |
| TBP 30% | 441 |
| TBP 50% | 521 |
| TBP 70% | 566 |
| TBP 90% | 673 |
| TBP 95% | 718 |
| Viscosity at 50 deg. C. (centistokes or cSt) | 501 |

TABLE 1-continued

| | |
|---|---|
| Asphaltenes (wt. %) | 4.2 |
| Vanadium (wt. ppm) | 38.3 |
| Nickel (wt. ppm) | 9.5 |

The effluent stream and the residual oil feed were combined to form a feed stream (stream 960). The pressure of the feed stream was maintained at about 25.3 MPa. The temperature of the feed stream was maintained at about 406 deg. C. The feed stream had a mass flow rate of about 1031.8 kg/h.

The feed stream was introduced to a second stage reactor (unit 920). The second stage reactor was a tubular type reactor having an internal diameter of 250 millimeters and a length of 25 meters. The tubular type reactor was positioned in a horizontal manner. The second stage reactor was maintained at a temperature of about 450 deg. C. and a pressure of about 25.3 MPa. The second stage reactor produced a product stream (stream 970). The product stream was cooled to a temperature of about 97 deg. C. (stream 972). The product stream was depressurized to a pressure of about 3.4 MPa (stream 974).

The product stream was introduced to a separator (unit 966). The separator was a gas-liquid hydrocarbon-water separator. The product stream was separated into a gas product stream (stream 976), a liquid product stream (stream 977), and a water product stream (stream 978).

The properties of the streams for EXAMPLE are provided in Table 2.

TABLE 2

| Stream No. | Temperature (deg. C.) | Pressure (MPa) | Mass Flow Rate (kg/h) |
|---|---|---|---|
| 930 | 50 | 0.1 | 100.0 |
| 932 | 53 | 29 | 100.0 |
| 934 | 120 | 29 | 100.0 |
| 940 | 25 | 0.1 | 900.0 |
| 942 | 28 | 29 | 900.0 |
| 944 | 410 | 29 | 900.0 |
| 980 | 25 | 0.1 | 0.7 |
| 982 | 38 | 29 | 0.7 |
| 984 | 150 | 29 | 0.7 |
| 946 | 405 | 29 | 900.7 |
| 936 | 389 | 29 | 1000.7 |
| 952 | 390 | 25.3 | 19.0 |
| 950 | 390 | 25.3 | 981.8 |
| 990 | 25 | 0.1 | 50.0 |
| 992 | 29 | 25.3 | 50.0 |
| 994 | 200 | 25.3 | 50.0 |
| 960 | 406 | 25.3 | 1031.8 |
| 970 | 450 | 25.3 | 1032.5 |
| 972 | 97 | 24.1 | 1032.5 |
| 974 | 101 | 3.4 | 1032.5 |
| 976 | 101 | 3.4 | 0.3 |
| 977 | 101 | 3.4 | 130.6 |
| 978 | 101 | 3.4 | 900.9 |

The liquid product stream had a composition as shown in Table 3.

TABLE 3

| | |
|---|---|
| API Gravity | 43.12 |
| Sulfur Content (wt. %) | 1.87 |
| Distillation Properties (deg. C.) | |
| TBP 10% | 48 |
| TBP 30% | 284 |
| TBP 50% | 317 |
| TBP 70% | 405 |
| TBP 90% | 532 |
| TBP 95% | 608 |
| Viscosity at 50 deg. C. (cSt) | 10 |
| Asphaltenes (wt. %) | 1.2 |
| Vanadium (wt. ppm) | 8.9 |
| Nickel (wt. ppm) | 1.1 |

The results show that the addition of the sulfur additive feed and the residual oil feed enhances the yield of liquid hydrocarbons by decomposing polyolefins in the presence of supercritical water.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for recycling a plastic material to produce hydrocarbons, the method comprising the steps of:
   introducing a plastic feed and a water feed to a first stage reactor, wherein the plastic feed comprises the plastic material, wherein the first stage reactor is operated at a pressure equal to or greater than 22.06 MPa and a temperature equal to or greater than 373.9 deg. C to produce an effluent stream, wherein the effluent stream comprises a mixture of the plastic material and water;
   separating unreacted solid components from the effluent stream in a separation device to produce a waste stream and a feed stream, where the unreacted solid components in the waste stream are selected from the group consisting of unreacted plastic material, coke, char, and combinations of the same; and
   introducing the feed stream to a second stage reactor, wherein the second stage reactor is operated at a pressure less than that of the first stage reactor but equal to or greater than 22.06 MPa and a temperature greater than that of the first stage reactor to produce a product stream, wherein the product stream comprises the hydrocarbons.

2. The method of claim 1, wherein the plastic material comprises polyolefins selected from the group consisting of: polyethylene, polypropylene, polybutylene, and combinations of the same.

3. The method of claim 1, wherein the first stage reactor is operated at a pressure ranging between 27 MPa and 35 MPa and a temperature ranging between 380 deg. C and 420 deg. C.

4. The method of claim 1, wherein the second stage reactor is operated at a pressure ranging between 24 MPa and 27 MPa and a temperature ranging between 420 deg. C and 470 deg. C.

5. The method of claim 1, further comprising the step of:
introducing a sulfur additive feed to the first stage reactor by combining the sulfur additive feed and the water feed, wherein the sulfur additive feed comprises sulfur-containing hydrocarbons selected from the group consisting of: thiols, sulfides, disulfides, and combinations of the same.

6. The method of claim 5, wherein the sulfur additive feed has a total sulfur content of greater than 5 wt. %.

7. The method of claim 1, further comprising the step of:
introducing a sulfur additive feed to the second stage reactor by combining the sulfur additive feed and the feed stream, wherein the sulfur additive feed comprises sulfur-containing hydrocarbons selected from the group consisting of: thiols, sulfides, disulfides, and combinations of the same.

8. The method of claim 7, wherein the sulfur additive feed has a total sulfur content of greater than 5 wt. %.

9. The method of claim 1, further comprising the step of:
introducing a residual oil feed to the first stage reactor by combining the residual oil feed and the plastic feed, wherein the residual oil feed comprises a residual oil selected from the group consisting of: atmospheric residue, vacuum residue, and combinations of the same.

10. The method of claim 9, wherein the residual oil has a total sulfur content of greater than 0.1 wt. %, wherein the residual oil comprises sulfur-containing hydrocarbons selected from the group consisting of: thiols, sulfides, disulfides, and combinations of the same.

11. The method of claim 1, further comprising the step of:
introducing a residual oil feed to the second stage reactor by combining the residual oil feed and the feed stream, wherein the residual oil feed comprises a residual oil selected from the group consisting of: atmospheric residue, vacuum residue, and combinations of the same.

12. The method of claim 11, wherein the residual oil has a total sulfur content of greater than 0.1 wt. %, wherein the residual oil comprises sulfur-containing hydrocarbons selected from the group consisting of: thiols, sulfides, disulfides, and combinations of the same.

13. The method of claim 1, further comprising the step of:
cooling the product stream to a temperature ranging between 80 deg. C and about 120 deg. C.

14. The method of claim 1, further comprising the step of:
depressurizing the product stream to a pressure ranging between 1 MPa and 5 MPa.

15. The method of claim 1, further comprising the step of:
introducing the product stream to a separator to produce a gas product stream, a liquid product stream, and a water product stream, wherein the gas product stream comprises gaseous hydrocarbons, wherein the liquid product stream comprises liquid hydrocarbons.

* * * * *

UNITED STATES PATENT AND TRADEMARK OFFICE
CERTIFICATE OF CORRECTION

PATENT NO. : 11,124,707 B2
APPLICATION NO. : 16/716999
DATED : September 21, 2021
INVENTOR(S) : Choi et al.

Page 1 of 1

It is certified that error appears in the above-identified patent and that said Letters Patent is hereby corrected as shown below:

In the Claims

Claim 1, Column 32, Lines 43 thru 48, reads:
"separating unreacted solid components from the effluent stream in a separation device to produce a waste stream and a feed stream, where the unreacted solid components in the waste stream are selected from the group consisting of unreacted plastic material, coke, char, and combinations of the same; and"
It should read:
--separating the effluent stream into a waste stream and a feed stream in a separation device, wherein the waste stream comprises solid components comprising unreacted plastic material, coke, and char , and wherein the waste stream is a fluid phase preconditioned mixture; and--

Signed and Sealed this
Tenth Day of May, 2022

Katherine Kelly Vidal
*Director of the United States Patent and Trademark Office*